United States Patent [19]

Stridsberg

[11] Patent Number: 5,442,250
[45] Date of Patent: Aug. 15, 1995

[54] ELECTRIC POWER TRAIN FOR VEHICLES

[75] Inventor: Lennart Stridsberg, Enskede, Sweden

[73] Assignee: Stridsberg Licencing AB, Sweden

[21] Appl. No.: 39,375

[22] PCT Filed: Oct. 9, 1991

[86] PCT No.: PCT/SE91/00683
§ 371 Date: Apr. 20, 1993
§ 102(e) Date: Apr. 20, 1993

[87] PCT Pub. No.: WO92/06530
PCT Pub. Date: Apr. 16, 1992

[30] Foreign Application Priority Data

Oct. 9, 1990 [SE] Sweden ................ 9003217
Jun. 12, 1991 [SE] Sweden ................ 9101787

[51] Int. Cl.⁶ .................... H02K 1/10; H02K 3/16; H02K 3/20; H02K 7/14
[52] U.S. Cl. ...................... 310/186; 310/185; 310/67 R
[58] Field of Search ............ 310/67 R, 179, 185, 310/186

[56] References Cited

U.S. PATENT DOCUMENTS

| | | | |
|---|---|---|---|
| 3,010,004 | 11/1961 | Clarey | 200/152 |
| 3,142,739 | 7/1964 | Grupen | 200/152 |
| 3,278,713 | 10/1966 | Grupen | 200/152 |
| 3,978,356 | 8/1976 | Spiesberger | 310/156 |
| 4,031,419 | 6/1977 | Spiesberger | 310/49 R |
| 4,167,692 | 9/1979 | Sekiya et al. | 310/268 |
| 4,190,779 | 2/1980 | Schaeffer | 310/49 R |
| 4,223,255 | 9/1980 | Goldman et al. | 318/138 |
| 4,315,171 | 2/1982 | Schaeffer | 310/49 R |
| 4,424,463 | 1/1984 | Musil | 310/186 |
| 4,687,961 | 8/1987 | Horber | 310/186 |
| 4,700,098 | 10/1987 | Kawashima | 310/186 |
| 4,751,448 | 6/1988 | Auinger | 318/801 |
| 4,754,207 | 6/1988 | Heidelberg et al. | 310/185 |
| 4,847,526 | 7/1989 | Takehara et al. | 310/185 |
| 4,874,975 | 10/1989 | Hertrich | 310/186 |
| 4,890,049 | 12/1989 | Auinger | 310/71 |
| 5,168,187 | 12/1992 | Baer et al. | 310/185 |

FOREIGN PATENT DOCUMENTS

| | | |
|---|---|---|
| 0300126 | 11/1981 | European Pat. Off. . |
| 0128671 | 12/1984 | European Pat. Off. . |
| 0295718 | 6/1988 | European Pat. Off. . |
| 0291219 | 12/1988 | European Pat. Off. . |
| 2397740 | 3/1979 | France ................ 310/186 |
| 2208854B2 | 2/1972 | Germany . |
| 2208854C3 | 2/1972 | Germany . |
| 2416695A1 | 4/1974 | Germany . |
| 61-42259 | 2/1986 | Japan ................ 310/185 |
| 2149226 | 6/1985 | United Kingdom . |
| 2216720 | 10/1989 | United Kingdom . |

Primary Examiner—Clayton E. LaBalle
Attorney, Agent, or Firm—Limbach & Limbach

[57] ABSTRACT

High torque brushless motors are proposed which have low weight and high efficiency. The permanent magnet rotor has many equally spaced poles of alternating polarity. The stator has a plurality of pole groups, each pole group have a plurality of poles with the same pitch as the rotor poles. Windings (211–216, 221–226, 231–236, 241–246, 251–256, 261–266) connected to electrical phases (R, S, T) are provided on the poles within each pole group to polarize the poles in the group with alternating polarity. The pole groups are displaced relative to each other and the gaps between the pole groups are filled by flux balancing poles (217, 227, 237, 247, 257, 267) which in many cases are unwound. The motor may be driven by means of an inverter and by providing it with at least two winding sections of each phase, configuration switches to connect the winding sections in at least one serial and one quasi-parallel configuration and at least twice as many bridgelegs (twice as many inverter switching elements) as would otherwise be required as a minimum in the selected bridge configuration it can be driven at two different torques. The configuration switches may be constructed as very low resistance high current mercury switches having a favorable geometric design.

16 Claims, 12 Drawing Sheets

Fig. 2
Fig. 3
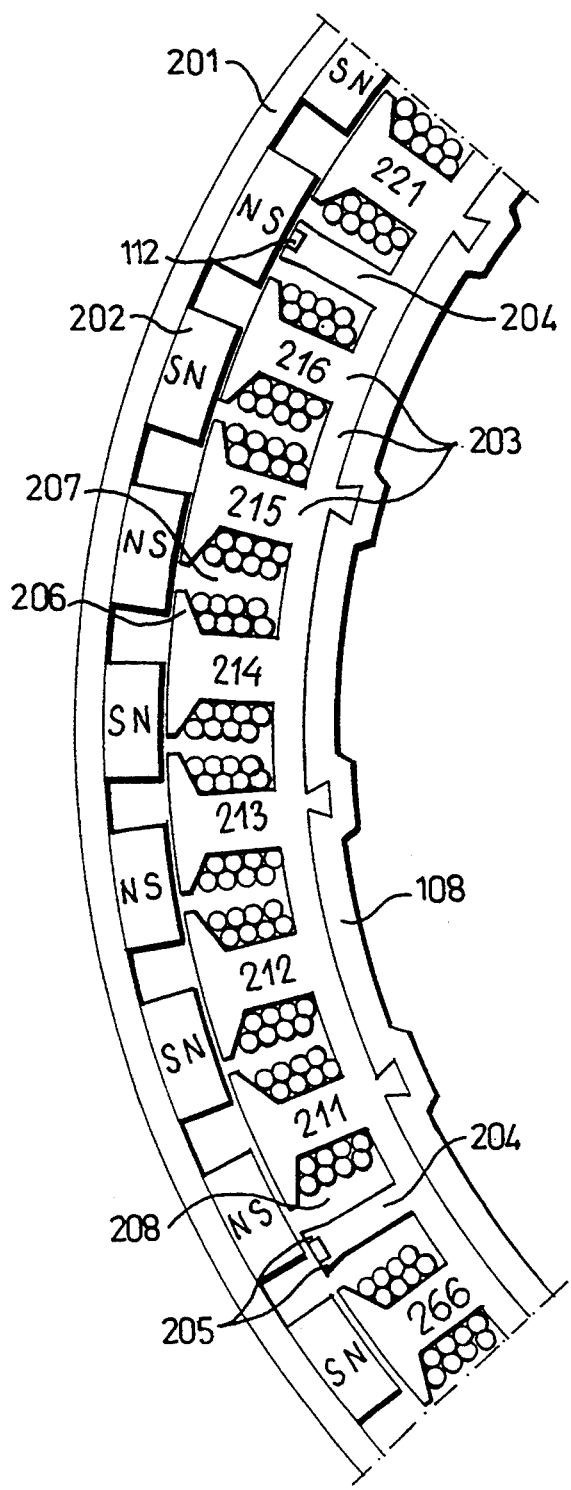
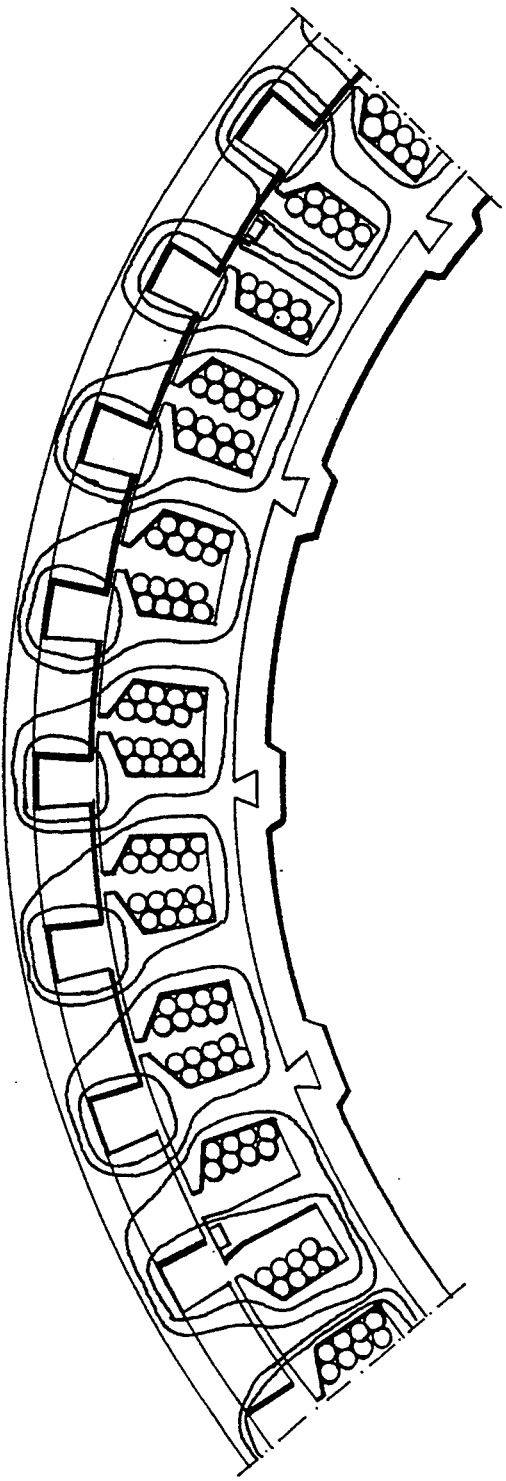

Phase 3 (T)

Phase 2 (S)

Phase 1 (R)

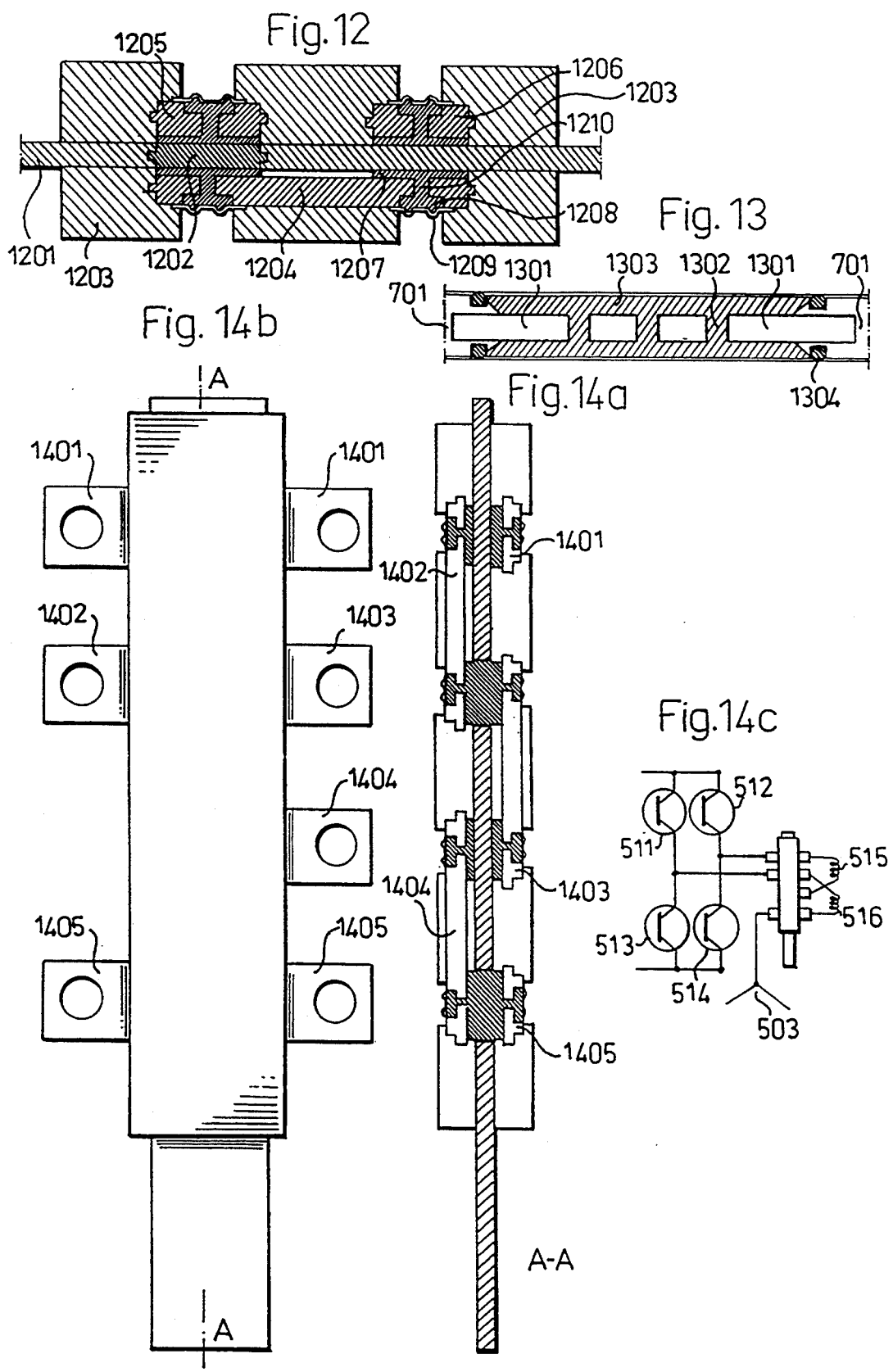

ELECTRIC POWER TRAIN FOR VEHICLES

FIELD OF THE INVENTION

The present invention is related to an electric powertrain for vehicles and in particular electric motors, inverters and switches particularly adapted thereto. The components of the powertrain may also in some cases be used separately for other purposes.

Thus the present invention is related to a high torque brushless DC motor with a low weight and a high efficiency. In the conventional way the motor has a rotor equipped with permanent magnets of alternating polarity and a stator with poles built from soft iron type material. In the stator the electrical windings are located.

Thus the present invention is also related to an inverter and motor design generally suited for brushless DC motors, induction motors and reluctance motors. The motor phases are provided with at least two winding sections of each phase, configuration switches to connect the winding sections of each phase in different configurations.

Thus the present invention is also related to a very low resistance high current switch. comprising parallel electrode surfaces arranged close to each other and a slide moving in the space between the electrode surfaces.

Apparatus according to the invention can equally well be used in association with a motor or a generator. In this text the word motor is generally used even if all described embodiments equally well can be used for generators.

BACKGROUND OF THE INVENTION

Electric powertrains are devices to transfer energy from an electric power source like a battery to a torque exerted by the tires of a vehicle and also if possible to feed some of the kinetic energy back to the battery while braking. The efficiency of these systems have however been so low that an increase thereof could make a substantial improvement of the range of electric vehicles. The present art can be illustrated by the ETX-II powertrain as presented on the 10th Electric Vehicle Symposium in Hongkong during authumn 1990. The ETX-II has been developed by Ford Motor Company and General Electric Company as a major element in the US Department of Energy's Electric and Hybrid Vehicle program. The ETX-II was quoted to be "the most advanced electric vehicle in operation today". Running in urban driving conditions as described in the FUDS driving schedule, the efficiencies of the electronic power inverter during driving was 97%, the motor efficiency was 87% and the transmission and wheel losses where rolling resistance was not included was 83%. During braking the efficiencies were 70, 72 and 44%, respectively. When taken together, the combined efficiencies are 70% for driving and 22% for braking.

It is the primary purpose of this invention to provide electric powertrains for vehicles with lower losses. The invention permits designs where most types of losses in prior art designs are reduced compared to the prior art by providing a motor with a higher efficiency in a size and torque range permitting insertion inside the tire, by providing an improved design principle for inverters and by providing a improved fluid conductor switch design. The complete inventive design or parts thereof can be used in application fields other than power trains.

DC motors using permanent magnets is a motor type most likely to achieve very high efficiencies, since the magnetic field from the permanent magnets is obtained without the losses occurring in the field windings of other DC motors or the losses incurred by magnetization currents in induction or reluctance motors. Mechanically commutated motors require extra maintenance and incur voltage and/or friction losses. Brushless DC motors seems to be the most promising candidate for the high efficient vehicle motor. The ETX-II uses such motors.

The market for brushless DC motors in the range of several watts and higher is totally dominated by designs having stators where the windings of the three phases are overlapping. This means that the area circumvented by a coil belonging to one phase do not only contain a flux carrying iron pole; it will also circumvent slots containing windings belonging to other phases. This gives a less efficient use of pole iron mass and requires longer copper windings. Motor designs where the winding coils only circumvents flux carrying iron give a more efficient use of copper and iron and are more likely to provide the very efficient high-torque motors required. In order to be able to use loss reducing inverter circuits with a competetive production cost, the number of phases in the driving electronics should be reduced. To be able to combine this with good utilization of the rotor flux induced voltages in the stator windings, the flux changes in many poles should be synchronized. Pole groups where the poles have the same pitch as the rotor poles seem to be well suited to meet this requirement.

Most (or all) prior art electric power trains use fixed winding configurations. Conventional series/parallel configurations have been suggested. These however give loop currents in a parallel configuration. These loop currents give losses which, in the case of high efficient low resistance motors, will easily surpass the gains obtained. Also the resistance of the configuration switches will create losses.

PRIOR ART

The European Patent Application EP-A-0 300 126 discloses a brushless DC motor using permanent magnets with a rotor similar to the rotor of the present invention except that the magnets seems to cover only 50% of the rotor circumference. The stator has a number of poles which is not equal to the number of rotor poles. Like the present invention, the windings are based on coils wound around one single stator pole. Unlike the present invention, all adjacent poles have an equal center-to-center distance (col. 9, line 43). Each stator pole carries a flux sensor. For optimum use of the flux from the permanent magnets, the currents in each stator pole is switched using separate electronic means. In some embodiments, two or more stator poles will obtain similar flux patterns and can then share power electronics (col. 11, lines 15ff.). This motor thus requires complex driving electronics.

The European Patent Application EP-A-0 291 219 discloses a brushless DC motor using permanent magnets with a rotor similar to the rotor of the present invention except that the magnets seems to cover 100% of the rotor circumference. The stator has a number of poles which is not equal to the number of rotor poles. Like the present invention, the windings are based on coils wound around one single stator pole. Unlike the present invention, all adjacent poles have an equal center-to-center distance. For optimum use of the flux from the permanent magnets, the currents in each stator pole should be switched using separate electronic means. In the cited application, the coils are connected to build three electrical phases, thus reducing the complexity of the power electronics but reducing the efficient use of the magnets. To optimally use the permanent magnets, the winding of a pole should be switched in a certain position between rotor magnet and stator pole, and the rotor angle corresponding to this optimal point is different for all 9 stator poles in the embodiment shown in FIG. 1 of this document.

The disclosure in the European Patent Application EP-A-0 295 718 is similar to that in EP-A-0 291 219. The stator teeth are equally spaced and all coils are connected to one of three electrical phases.

The U.S. Pat. No. 4,700,098 describes a brushless DC motor having unequal pole spacing in order to diminish the "cogging" effect. The wound poles are not grouped and there may be poles as in FIG. 4 which are unwound.

U.S. Pat. No. 4,847,526 discloses a brushless DC motor using permanent magnets with a rotor similar to the rotor of the present invention except that the magnets seems to cover 100% of the rotor circumference. The stator has a number of poles which is not equal to the number of rotor poles. Like the present invention, the windings are based on coils wound around one single stator pole. FIG. 5 of this patent seems almost identical to FIG. 3 of EP-A-0 295 718 and FIG. 5 of EP-A-0 291 219. Unlike the present invention, all stator poles are wound and are grouped in M (normally 3) electrical phases each having k (normally 3) physically adjacent poles as stated in claim 5. In some embodiments described the poles have not equal center-to-center distances. Again, this reduces the complexity of the power electronics but does not give optimal use of the magnets and windings.

U.S. Pat. Nos. 4,190,779 and 4,315,171 disclose step motors having grouped stator poles; no flux balance poles are included.

The European Patent Application EP-A-0 337 032 describes an electric vehicle with some kind of permanent magnet motor incorporated in the wheel assembly having an air current regulating cover with an inlet adapted to introduce ambient air into a motor cooling channel. The stator arrangement is not described.

Configuration of the windings of electric motors have been used for decades. A very common case is the off-Y-D-configuration switch used to obtain a softer start and reduced start currents for three phase induction motors. For various kinds of electric motors it is thus previously known to divide the phase windings into segments which can be connected either in series or in parallel by means of suitable switches, see e.g. the U.S. Pat. Nos. 1,123,321 and 4,234,808 and European Patent Application 0 300 126. However, in the electric circuit loops which are obtained in the parallel connection loop currents will be induced or otherwise generated and they will cause considerable losses.

High current mercury switches have been used for many decades. Switches where a quantity of mercury is moving in a glass tube when the tube is tilted and where the electrodes are small in surface area and far apart are found in many applications, see e.g. the German Auslegeschrift 1 085 590. The current conducting mercury body thus has an unfavorable relation between area and length and also of the contact areas of the electrodes. As the resistivity of mercury is about 60 times higher than that of copper, this gives a higher resistance than may be necessary. The switches must be mounted in a substantially horisontal position. As an example of prior art, type 3704 from GORDOS in size 7.5×7.5×17.5 mm has an on resistance of 50 mOhm.

U.S. Pat. Nos. 1,915,462 and 2,973,417 disclose mercury switches which are controlled by means of a solenoid and have a similar basic design. Also in these switches, the mercury conductor length is very high in relation to the mercury wetted area of the electrodes. They are position dependent. As an example of prior art, type A105 single pole single throw switch from Comus International, 263 Hillside Avenue, Nutley, N.J. 07110 U.S.A is 28.5×28.5×79 mm and has an on resistance of 2 mOhm.

The German Auslegeschrift DE 1 092 097 describes a switching element comprising a movable bar of a non-conducting material. The bar is coated with a conducting layer at some portions of its length and it is displaced in a channel or bore in a body of a non-conducting material. In the body there, are depressions filled with mercury which may contact the conducting layer on the bar at some positions thereof. Since the electric current must pass through a thin metal layer, this construction is not adapted for high currents. Also the switch body must be located substantially horizontally.

U.S. Pat. No. 3,278,713 discloses a positionally independent mercury switch which also has an unfavorable relation between the mercury conductor area and length. In the off position, the mercury is divided into two bodies, each having one device to keep mercury pressure constant. The mechanical movement is parallel to the direction of current in the switching section of the device.

U.S. Pat. No. 3,342,965 discloses a positionally independent mercury contact, which is using a mercury drop. The possible maximum current is limited as the invention utilizes the mechanical properties of the surface tension of the mercury drop as a mechanical element. The switch can therefore only be implemented in small dimensions. The mechanical movement is parallel to the direction of current in the switching section of the device.

U.S. Pat. No. 3,786,217 discloses a miniature mercury switch. It has a high moving mass (the length of the contact making body is about 8 times the mercury contact diameter) and is therefore less capable to withstand shocks and vibrations. It is not claimed to be a high current device. The mechanical movement is parallel to the direction of current in the switching section of the device.

As an example of prior art miniature mercury relays, type HGRM from C P Clare, 14.2×10.4×40.8 mm in size, has an on resistance of 25 mOhm. It is a single pole dual throw device.

OBJECTS OF THE INVENTION

It is a primary object of the present invention to provide electrical power trains for vehicles being superior to prior art by having lower losses from the power source electric input terminals to wheel shaft mechanical output.

It is a further object of the present invention to provide electrical power trains for vehicles being superior to prior art by having no losses in the mechanical transmission from motor shaft to tire shaft.

It is a further object of the present invention to provide electrical power trains for vehicles being superior to prior art by giving a higher motor efficiency. This can be used to give a longer range for given batteries or the same range for lighter and less expensive batteries.

It is a further object of the present invention to provide electrical vehicle power trains being superior to prior art by only having a very small and flexible space requirement in the car body. This permits a more optimal positioning of other car components like batteries as the motors are hidden in the wheels and the other components can be placed anywhere.

It is a further object of the invention to provide light motors with a high output torque and a very high efficiency in a shape compatible with normal tire and wheel sizes, thus permitting the motors according to the invention to be used inside vehicle rims, in vehicles but placed in the car body away from the rim using flexible couplings, or in other vehicle or non-vehicle uses.

It is a further object of the present invention to provide a stator layout that permits the use of high energy magnet material, gives a very good utilization of the laminated iron and copper winding and still permits the use of comparatively simple driving electronics and an efficient use of rotor permanent magnets with a stator that has a limited number (normally three or six) of phases in which all winding parts of a phase have synchronized flux transitions.

It is a further object of the present invention to provide lower inverter switch CONDUCTION losses due to lower inverter switch currents for the same winding current in the lower speed range.

It is a further object of the present invention to provide lower inverter SWITCHING losses due to lower semiconductor switch currents for the same winding current in the lower speed range.

It is a further object of the present invention to provide electrical power trains for vehicles being superior to prior art by giving a more efficient utilization of semiconductor material like silicon area. This can be used to obtain lower losses or less expensive designs or a combination thereof.

It is a further object of the present invention to provide lower losses due to either lower ripple currents or a lower switching frequency in the lower speed range.

It is a further object of the present invention to provide lower losses due to lower AC currents in the power source for the same winding current.

It is a further object of the present invention to provide lower losses due to a thinner winding wire for a given supply voltage and therefore lower eddy currents in the windings.

It is a further object of the present invention to provide a switch with very low resistance (fractions of one milliohm) with a small size capable of carrying currents in the order of 100 Ampere.

It a further object of the invention to provide compact high current switches using a very small volume of conductive fluid.

It a further object of the invention to provide very low resistance switches suited to be mounted in any position and which can withstand vibration and shocks.

It a further object of the invention to provide a switch element which economically can be used as a single pole double throw switch.

It a further object of the invention to provide switches suited to form economical, compact relay apparatus where several switches are actuated simultaneously.

SUMMARY OF THE INVENTION

The purposes and advantages of the invention are achieved by means of the characteristics as set out in the appended claims.

The purpose of the invention may be obtained by using permanently magnetized rotors and a stator layout that permits the use of high energy magnet material, enables an uniform and thus efficient use of the low mass of flux carrying iron and short copper windings by using single-phase windings around each pole, and permits synchronized flux changes by having grouped poles with a limited number (normally three or six) electrical phases thus permitting the use of few phases in the drive electronics.

The motors according to the invention can be used located inside vehicle tire rims or in vehicles placed in the car body away from the rim using flexible couplings, and they may be equally well suited for other vehicle or non-vehicle uses.

Another concept useful in many embodiments of motors according to the invention (but also in conventional, synchronous motors, induction and reluctance motors) is an electric "gear box" that reduces the need for conventional gear boxes and permits low-cost highly efficient power inverters in vehicle applications.

The highly compact and efficient motors/generators according to the invention can however be used in other applications, taking advantage of their high torque and low weight.

In its most general form the invention is first concerned with an electric apparatus—a motor or generator, in the normal case being of the rotary type but also linear designs may be used—having a field magnet with magnetic poles and the field magnet may either be fixed or rotating. The magnetic poles which in the preferred case are separate permanent magnets are located at the surface or the circumference of a field magnet support and generally have an equal spacing or pitch. The field magnet support is in the conventional way made from a material having a high permeability.

The magnetic poles are located immediately opposite to the poles of an armature, this armature being either movable, e.g. rotatable, or fixed respectively, in such a way that the armature can move or rotate in relation to and in the rotating case concentrically with the field magnet. The armature has a core from which its poles protrude and these poles are provided with an electric winding. The winding of each pole is connected to one of the phases of an electrical system having a number of phases.

Thus there is, in the rotating case, a shaft supporting one of the field magnet and the armature to allow the rotary movement of one of these parts and also to maintain a small radial gap between the a circumferential surface of the poles of the field magnet and the armature.

The invention is particularly concerned with the arrangement of the wound armature poles and the connection of the windings thereof. Thus the poles are essentially comprised in pole groups. A pole group comprises all the armature poles which are located in a of the armature and all poles in a pole group have their windings connected to the same electrical phase. Thus each pole in a pole group is the neighbour of another pole having its winding connected to the same phase.

The armature poles in the pole groups are generally located at the same pitch as the poles of the field magnet.

Between the pole groups flux balancing poles are located in such a way that there is only one flux balancing pole between neighbouring pole groups. These may be unwound or have a winding comprising a small number of turns compared to the number of winding turns in the windings of the poles in the pole groups. The length of the flux balancing poles in the circumferential direction of the armature gap .may differ significantly from the corresponding length of the poles in the pole groups and it may, in the preferred case, be significantly smaller.

A coupling for inverters and motors is also proposed comprising providing the motor phases with at least two winding sections of each phase, configuration switches to connect the winding sections in at least one serial and one quasi-parallel configuration and at least twice as many inverter switching elements as would otherwise be required as a minimum in the selected bridge configuration.

The high efficiency of motor/generators according to the present invention is specially beneficial for electric vehicle use since the available energy in the batteries is a serious restriction in such vehicles.

Thus the present invention is related to an electric motor the windings of which are powered from an electric power source and are switched on and off by means of some kind of power switches, such as semiconductor switches. As is conventional, these switches with their control devices and associated wiring may be termed an inverter coupling or driver for the motor, the power switches thus being inverter switches.

In the preferred embodiment the motor is an electric motor having a field magnet, e.g. with permanent magnets, and an armature with windings, the field magnet and the armature being arranged to move in relation to each other, for instance rotate, or generally that when the windings are suitably energized a torque or force will be experienced by one of these motor parts in relation the other.

The windings of the motor which are connected to the same electric phase comprise at least two winding segments and some of the winding segments for each phase may be connected to each other by means of configuration switches. Thus these considered winding segments of each phase always can be connected to each other in series.

In another configuration or connection which is obtained by changing the state of the configuration switches the considered winding segments may be connected in quasi-parallel. In this configuration the winding segments are delivering the same torque as if they were connected in parallel but are not capable of conducting induced loop currents. This is obtained by arranging the connections of the switches and the considered winding segments in such a way that at least one switch such as an inverter switch is located inside the parallel loop when the winding segments are energized. The currents that flows in the quasi-parallel winding will flow through at least one inverter switch in the "on" state using voltage from the power source or through at least one "free-wheeling" diode using voltage derived from energy stored in the winding inductance. The voltage induced in the windings by the EMF of the rotor will thus always be too low to force current through the inverters switches, thus blocking the loop currents, which otherwise would cause considerable losses.

By means of the different configurations the motor will be driven with different torques, forces or velocities respectively.

In the inverter coupling the windings as is conventional are connected to the centre of bridge legs which comprise two inverter switches and are connected to the poles of the electric power source. For each one of the considered winding segments an own separate bridge leg may be provided. Thus in the quasi-parallel configuration each one of the considered winding segments is connected to one pole of the power source through its own inverter switch.

The windings of the electrical phases may be connected in a star connection. Then the considered winding segments in the quasi-parallel configuration for each phase may be connected with one of their ends to the centre of the star. In the series configuration one of the considered winding segments for each phase may with one of its end be connected to the star centre.

In an embodiment of the invention the windings for each phase may be divided into four winding segments. By means of the configuration switches the following configurations may be obtained
  all the winding segments for each phase are connected in series,
  all are connected in quasi-parallel,
  two winding segments in a first pair are connected in series and two winding segments in a second pair are also connected in series and the first pair and second pair are connected in quasi-parallel.

The configuration switches may be realized as double throw switches and then there may be at least one double throw switch for each one of the considered winding segments of each phase.

Also a very low resistance high current mercury switch is provided to be used as the configuration switches, comprising mercury wettable, parallel electrode surfaces arranged close to each other and a slide moving in the space between the electrode surfaces in a direction perpendicular to the direction of the current in the part where switching occurs, the slide having one part permitting a low resistance connection between the two parallel electrode surfaces in the "on" position and another part isolating the two electrode surfaces from each other in the "off" position, the switching action being executed by moving the slide. The contact medium is one or more cavities filled with a liquid conductive fluid like mercury, the cavity having a comparatively large area against the mercury wettable electrode surfaces and a short distance between these surfaces. Double throw embodiments are disclosed but single throw devices can easily be obtained by removing suitable portions of the double throw switches. An arrangement permitting a temperature independent pressure in the contact fluid bodies is also disclosed.

The switch may thus comprise two parts, a first and a second part, which can be moved in relation to each other. The first part contains a portion which is electrically conducting. This portion can come into contact with the two conducting contact portions of the second part. In the on-state of the switch a current can flow between the contact portions through the conducting portion of the first part. Thus there are some contact surfaces of the contact portions and the conducting portion and the direction of the current is substantially perpendicular to these contact surfaces. In the off-state of the switch no current can pass between the contact portions and the conducting portion of the first part. A direction of movement of one of the parts between these two states of the switch can the be defined and the general configuration of the switch is given by the condition that the direction of the current in the on-state of the switch is substantially perpendicular to said movement direction.

One of the conducting portion of the first pan and the two contact portions of the second part or all these portions are conductive liquid such as mercury, a liquid alloy thereof or another liquid metal.

The contact surfaces in the on-state of the switch can the made large and also the cross-section of the all conducting portions can be made large to give a very small resistance of the switch in this state.

Preferably the first part is rod-shaped or plate-shaped and may move in a bore in the second part. The conducting portion of the first part may then be mercury inside a throughhole in the first part or this hole may contain an ordinary conducting metal. The first part may also have two separate portions which are mechanically linked to define a space filled with mercury inside the bore.

The contact portions of the second part may be cavities inside the second part, these cavities being connected to the bore and containing mercury. The cavities will then be located opposite to each other at different sides of the bore.

Preferably the first part is plate-shaped having two opposite large surfaces and said contact surfaces on the first pan will then have their location on these large surfaces.

BRIEF DESCRIPTION OF THE DRAWINGS

The invention will now be described with reference to the accompying drawings wherein

FIG. 2 shows sectionally a segment in a larger scale the airgaps and windings of the embodiment of a motor according to the invention shown in FIG. 1.

FIG. 3 shows the principal flux flow in the motor segment shown in FIG. 2.

FIG. 4a shows schematically the windings of the motor according to the invention which is illustrated in FIG. 1 and of which FIGS. 2 and 3 show a segment.

FIG. 4b shows the electrical interconnection of the wound poles in FIG. 4a.

FIG. 6b shows vectorially the time position of the first three and the last three electrical phases in the 6 phase motor in FIG. 6a.

FIGS. 7a and 7b show in a cross-section and a plan view of an embodiment of a low resistance, double throw switch with a sliding mercury contact suitable for the "electronic gear box" shown in FIG. 5a.

FIGS. 11a shows the circuits controlling pulse width and frequency for the inverter shown in FIG. 5a.

FIG. 12 shows a double throw switch with static mercury contacts according to the invention.

FIG. 13 shows a sliding mercury contact with a mercury wettable metal spacer.

FIG. 14a and 14b show a cross section and a plan view of a double pole double throw switch according to the invention suited for the electronic gearbox shown in FIG. 5a.

FIG. 14c shows the switch in FIGS. 14a and 14b connected to one of the phases in FIG. 5a.

DETAILED DESCRIPTION OF A PREFERRED EMBODIMENT

Figure 1:
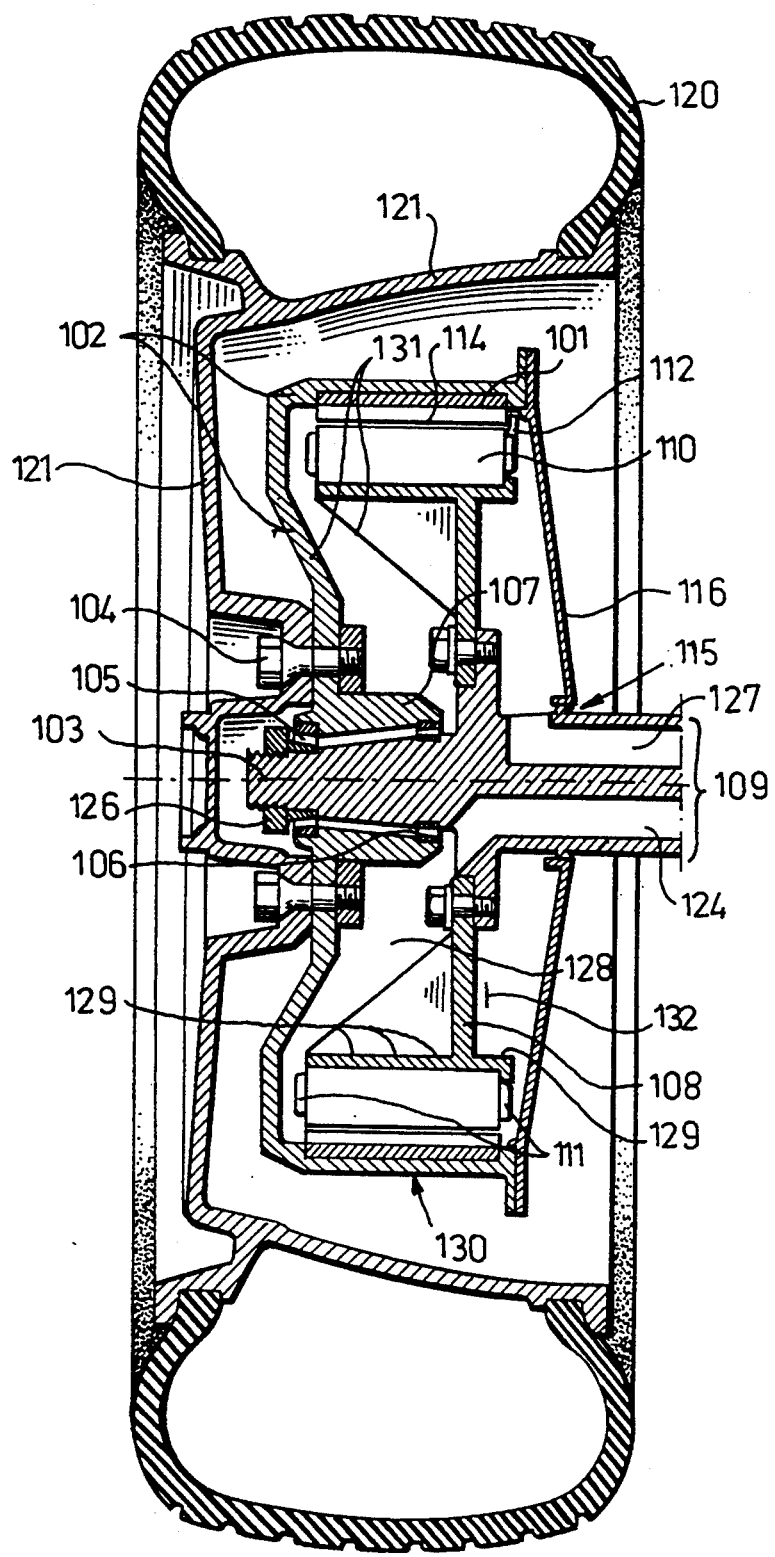
FIG. 1 shows an embodiment of a motor according to the invention inserted inside a wheel rim for use in ordinary cars.

FIG. 1 shows a possible embodiment of a motor according to the invention built into a vehicle wheel. It consists of an outer rotor 101 that is attached to the inner cylindrical surface of the marginal portion of a cup-shaped rotor-supporting component 102. The cup 102 also comprises a generally disc-shaped portion as the "bottom" of the cup located around the rotational axis of the motor. The cup supports and is located inside the rim 121 of the car wheel. It also comprises or is joined to the outer part of a bearing housing 107, which comprises bearings 105 and 106 connecting the bearing housing 107 to the wheel shaft 103. The shaft 103 is connected to the stator 110 by a supporting element 108 comprising a disc-shaped central part and a cylindrical outer part, this outer part being connected to the inner central part at an annular region located at some distance from the edge of the cylindrical part. Also the outer part may by supported by radial flanges extending from the central part. All of the wheel-motor assembly is bearingly or fixedly attached to the vehicle body by bearing elements or fastening elements cooperating with the axle end 109. The tire rim 121 is fastened to the cup 102 by means of screws 104. A tire 120 is mounted on the rim. The elements indicated at 103, 104, 105, 106, 107, 109 and the central part of the cup 102 have a shape and construction found in most motor cars and may in many aspects be designed in accordance with present art of automotive design.

The essential parts in FIG. 1 as regards this invention are the rotor 101, the stator 110 and the protruding parts of the windings 111. These parts forms a "ring" or a cylinder. Some data obtained from a simplified mathematical model of the motors according to the invention will be quoted. For the active motor cylinder according to FIG. 1, the model gives 153 mm in outer rotor radius, an inner stator radius of 118 mm and a rotor length of 78 mm. The stator windings increase the stator length to 88 mm. The tire illustrated in FIG. 1 is a 205/50R16. There is however space enough between the cup 102 and the rim 121 to permit 15" rim tires like 185/65R15, 195/60R15 or 205/55R15, thus permitting tyre sizes acceptable to most cars with total normal operation mass of some 1200–1400 kg.

A special requirement not present in normal motor car wheel design is some kind of angular position detector(s), in FIG. 1 illustrated as Hall element flux detectors 112 sensing the stray flux from the rotor 101. Alternatively, angular transducers could be placed for example in the positions indicated at 131, that is at the inner side of the disc-shaped "bottom" of the rotor supporting cup 102 and attached the oppositely located side of the stator support 108 or its flanges, or somewhere else. The gap 114 between the rotor 101 and the stator 110 must be protected from large foreign particles and corrosive fluids. This is accomplished by a cover disc 116 and a seal 115.

Disc brakes or drum brakes can be attached to the inside of the cup 102, or (assuming a more rigid design of the covering element 116) to the cover disc 116. The brakes will in most applications only be used for parking and for emergency situations. Full regenerative braking using the motor of the embodiment of FIG. 1 will permit retardations of about 4–5 m/s$^2$ assuming that the battery system and power electronics can handle the corresponding charge current. In such cases all braking during normal driving will be done without the use of mechanical brakes.

Cooling can be achieved by thermal conduction or by entering compressed air through a channel 124 in the wheel shaft 109. The air will establish a pressure inside the cavity 128 located inside the central part of the rotor supporting cup 102, will pass through the airgap 114 between the magnets to the space immediately inside the disc cover 116, and can exit through another channel (not shown) like the channel 127 in the shaft 109. For very heavy duty applications cooling fluid tubes can be attached to the inside of the stator in positions as indicated at 129, that is to the inner cylindrical surface of the outer part of the support element 108. Cooling fins can be provided at the outer surface 130 of the outer cylindrical portion of the cup 102, between the central radially extending part and the cylindrical part of the support element 108 and may be identical to the above mentioned support flanges, and to both sides of the cover disc 116 in order to improve convection cooling. The design of the generally disc-shaped part of the rim 121 extending from the central hub portion to the generally cylindrical edge portion supporting the tire will also affect the convective cooling.

Possible control devices and the sensors for the wheel position and temperature are interconnected through cables inside the wheel. The electric power to the motor and other electrical equipment inside the wheel is provided by means of wires. These wires pass from the car through the channel(s) 127 or 124 in the wheel axle 109. (All nonrotating connections must be led inside the seal 115.) The set of switches required for an "electronic gearbox" may also be inserted in the wheel assembly, for example located in position 132 on the disc-shaped part of the stator support element 108.

The elements indicated at 126 are washer, nut and other conventional elements to permit a suitable play in the bearings 105 and 106 and to ensure that the play will not change due to unintended movements of the nut.

FIG. 2 shows somewhat more than one sixth of the stator and rotor arrangement of an embodiment of the invention like the one illustrated in FIG. 1.

The outer rotor 101 in FIG. 2 comprises an outer cylindrical ring 201 of a magnetically permeably material like iron and magnet poles 202 of permanent magnet material like NdFeB or NdPrFeB, these poles being attached to the inner cylindrical surface of the ring 201. In the wheel motor of FIG. 1 the outer ring 201 should be attached to the inner cylindrical surface of the edge portion of the cup 102. The permanent magnet poles 202 are oriented in such a way that all poles having an even order number, as seen in the circumferential direction, have the same polarity and all odd numbered poles have the opposite polarity. The magnets cover approximatively ⅔rds of the air gap circumference.

The stator as indicated at 110 in FIG. I comprises a base ring 203 made of, for example, laminated iron like in most motors. Flux balancing poles 204 with pole pieces 205 and main poles 211–216 and 221 with pole pieces 206 close the flux path from the permanent magnets 202 and the outer ring 201.

The securing of the permanent magnets 202 to the inner side of the permeable iron ring 201 is comparatively easy since the centrifugal forces act to keep the magnets pressed against the outer ring 201. The securing may for instance be achieved by gluing.

The wound stator poles (like 211–216) which have windings belonging to the same phase are grouped together as seen in the circumferential direction in one or more groups, that is in every group the poles are located adjacent to each other in such a way that there are no other poles, belonging to another phase or unwound poles, located inside the group between the poles of the group. The embodiment in FIG. 2 is a 38 pole motor (i.e. the rotor has 38 poles) with three electrical phases, each phase having two pole groups with six poles each. All wound stator poles in one group have the same angular pitch (in the case of the embodiment of FIG. 2 (360/38)°), which is the same as the pitch of the permanent magnet poles on the outer rotor ring. The flux balancing poles of the embodiment of FIG. 2 occupies ⅓ of the pitch of the wound poles. The stator as illustrated thus has 6.6=36 wound poles and 6 flux balancing poles.

The wound poles all have a coil wound around each single pole. The section through the eight wire turns constituting the winding for the pole 212 is marked with dots on the upper side and crosses on the lower side as seen in FIG. 2 to indicate the direction of the current at some given time. The coils around the poles 212, 214 and 216 are wound in the same direction while the coils around the poles 211, 213 and 215 are wound or connected in the other direction. When the coils are energized by an electrical current from the power electronics, this current will magnetize stator poles 211,213 and 2 15 in one direction and the poles 212, 214 and 216 in the opposite direction.

The flux sensors 112 can with some advantage be placed close to or in a depression in the flux balancing poles 204.

FIG. 3 shows the same parts as FIG. 2. This Figure is intended to illustrate the advantages provided by providing flux balancing poles 204. The reference numbers in FIG. 3 are identical to those of FIG. 2. In order to make the Figure easy to understand, each permanent magnet 202 is assumed to be able to drive a magnetic flux corresponding to four flux lines in FIG. 3. As shown in the FIG., the flux density can be kept fairly balanced both over the surface of the permanent magnets, and in the flux paths through the outer soft iron ring 201 and and the inner base ring 203. This will permit that the outer rotor ring 201 and the stator base ting 203 can be made as thin elements having a uniform thickness and that they are well utilized as a flux path. This will in turn permit low-weight motors providing high output torques. The relatively even flux density for all permanent magnets, also for those which are not close to a main stator pole, will maintain at a high level the absolute value of the lowest flux density in the permanent magnets when the rotor moves past the energized stator poles. This will with present magnet technology permit the use of low cost magnet materials (like NdFeB instead of SmCo) or grades with higher energy density (like using NdFeB materials with BH products of about 260–335 kJ/m$^3$ instead of material qualifies of about 210–265 kJ/m$^3$).

Figures 4A, 4B:
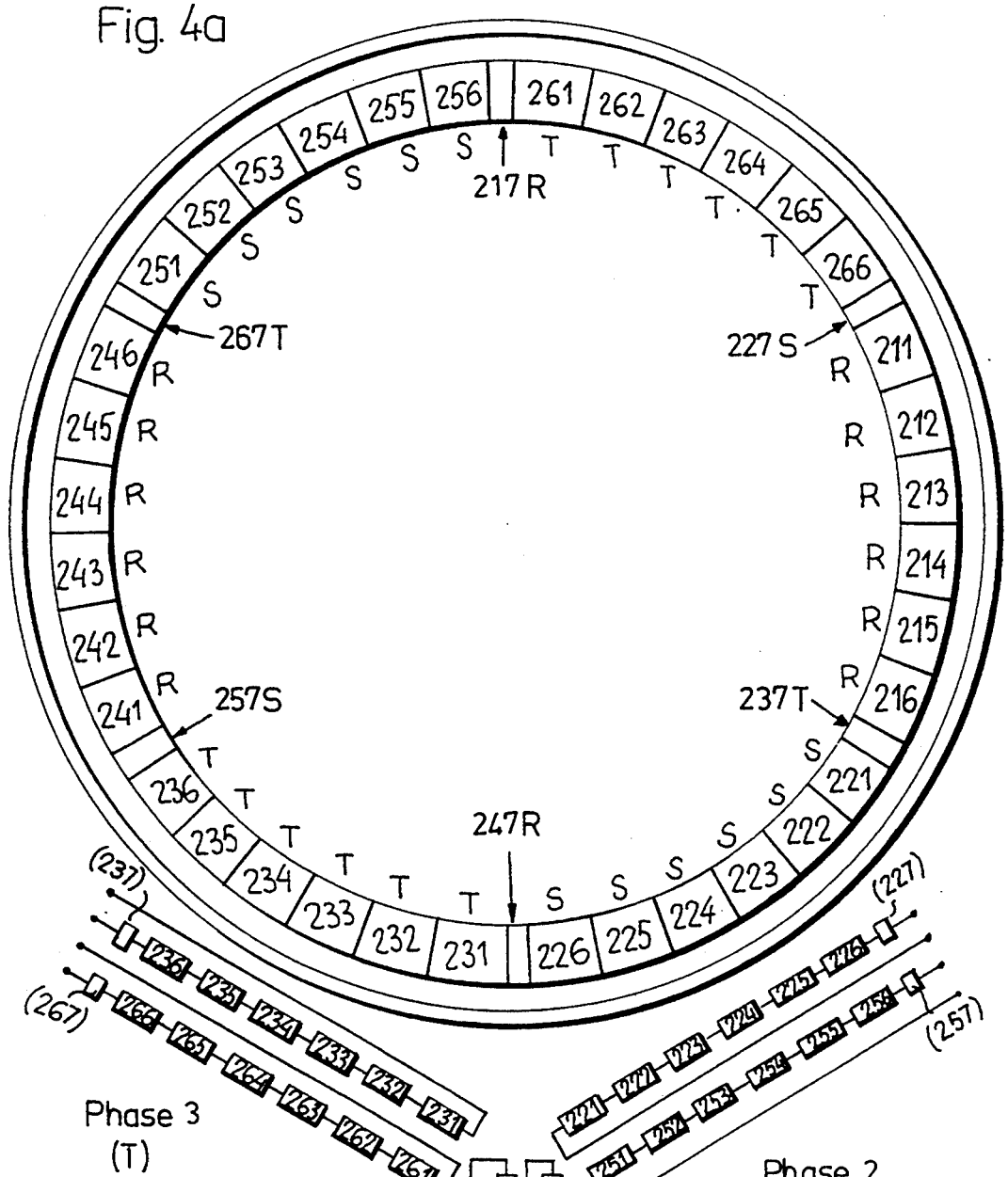

FIG. 4a shows schematically the windings of the whole motor construction shown in FIGS. 1, 2 and 3. The three electrical phases have each two pole groups. Thus poles 211, 212, 213, 214, 215, 216 and 241, 242, 243, 244, 245 and 246 belong to one phase (phase 1). The odd coils in each group must be wound or connected oppositely to the even coils to produce oppositely directed magnetic fields.

As is geometrically determined by the conditions that the permanent rotor poles are equally spaced and that the poles in every pole group have the same pitch as the rotor poles, the flux balancing poles can be either ⅓ or 4/3 of the wound stator pole pitch assuming a 3 phase system. In a more general case, the angular pitch taken by a flux balancing pole should be $(n/p) \cdot a$, where n is a (small) natural number not integrally divisible by p or not having an integer factor common with p, p is the number of phases and a is the pitch of an active (wound) pole.

As can be seen in FIG. 2, there is some free space around the flux balancing poles which could be used for a winding. In the implementation shown, this winding slot is however far smaller than the slots around the normal poles like 212, thus permitting few turns. For the embodiment shown, the available winding area is only 23% when compared to a normally wound pole like 212. In the embodiment shown, the winding wire has a rather large diameter. It is not clear that the wire chosen to fit the winding slot for poles like 212 will utilize the tiny winding slot around pole 204 in an efficient manner. In the case shown in FIG. 2 the diameter of the wire happens to give a space 208 that eventually could permit a four turn coil as this single layer coil can utilize the free space 207 required between the pole group pole coils to permit low cost winding; this permits a winding area that is 50% of the area that can be utilized for pole group pole coils with the winding technique used. (This four turn winding is not shown in FIGS. 2 and 3.)

In FIG. 4a the possible windings around the flux balancing poles 201 are indicated as 217, 227 etc. The no load voltages from coils 217 and 247 are in phase (or may also be 180° out of phase) with the coils 211–216 and 241–246.

In association with the schematic motor in FIG. 4a the interconnection of the coils is illustrated in FIG. 4b. The windings in each pole group are connected in series with each other. The flux circumvented by the coils 217 etc. of the balancing poles is even for a very thin winding wire far lower than that of the other coils (some 11%), this fact being schematically illustrated with a smaller size of the symbol used to indicate these coils. Thus the possible winding 217 etc. of the balancing poles is connected in series with the poles which are contained in a pole group belonging to a phase which is not connected to the pole groups adjacent to the considered balancing pole.

Figure 4C:
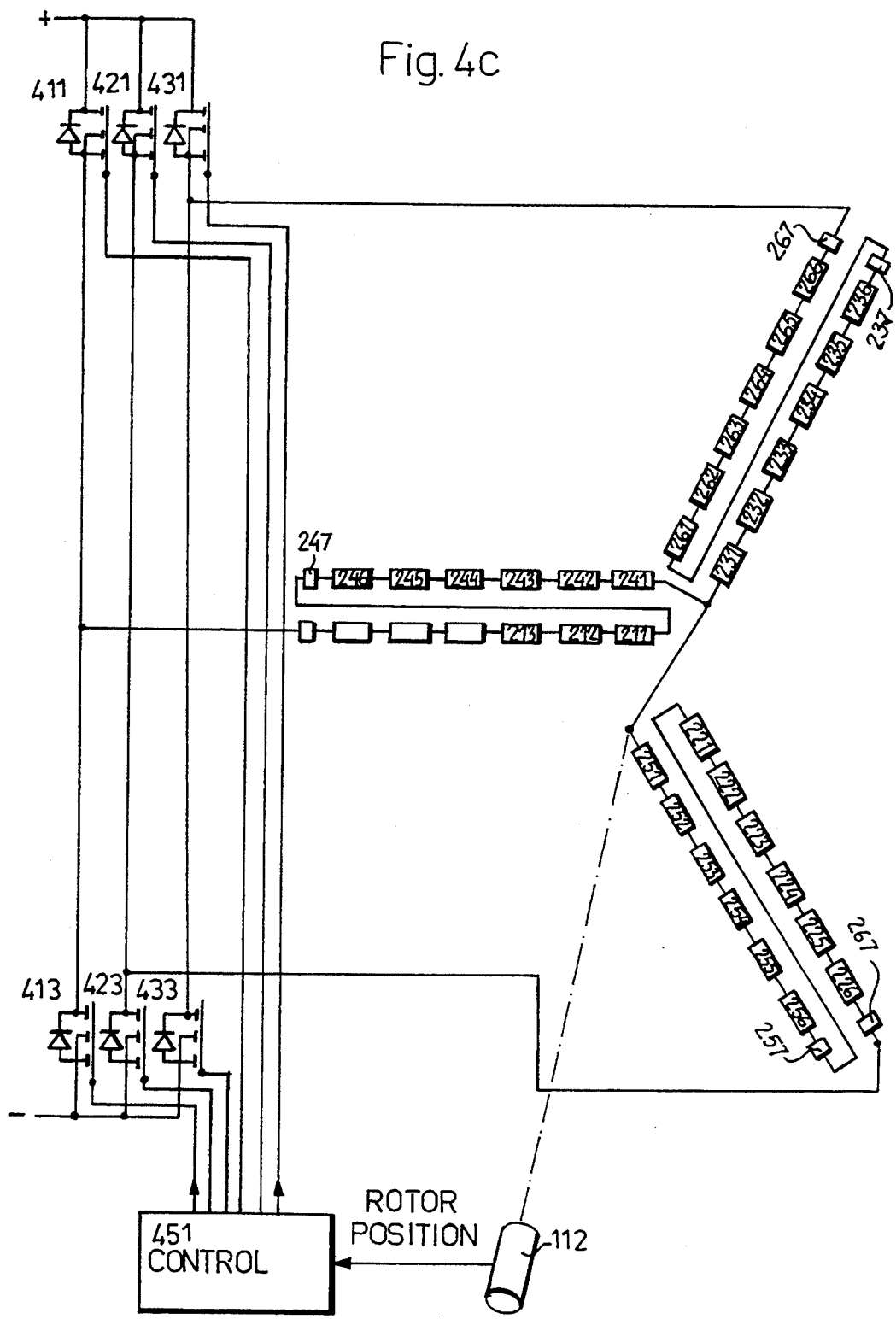
FIG. 4c shows the motor in FIG. 4a connected to a conventional inverter.

As is illustrated in FIG. 4c the electronic control and commutating of the motor can be realized in the conventional way by means of semiconductor inverter switches such as MOSFET transistors with internal parasitic diodes 411, 413, 421, 423, 431, 433, which are controlled by electrical signals from a control unit 451. The control unit 451 uses the signals provided by the rotor positions detectors 112 in order to deliver correct control signals. Thus the two winding groups like 211–217 and 241–247 of each phase are connected in series with one another and the total windings for each phase are connected to the windings of the other phases in a conventional star configuration. There are two inverter switches for each phase, 411 and 413 for phase 1, 421 and 423 for phase 2, 431 and 433 for phase 3. Such a pair of switching elements are located in a bridge leg connection to the centre of which the appropriate winding is connected.

Figure 5A:
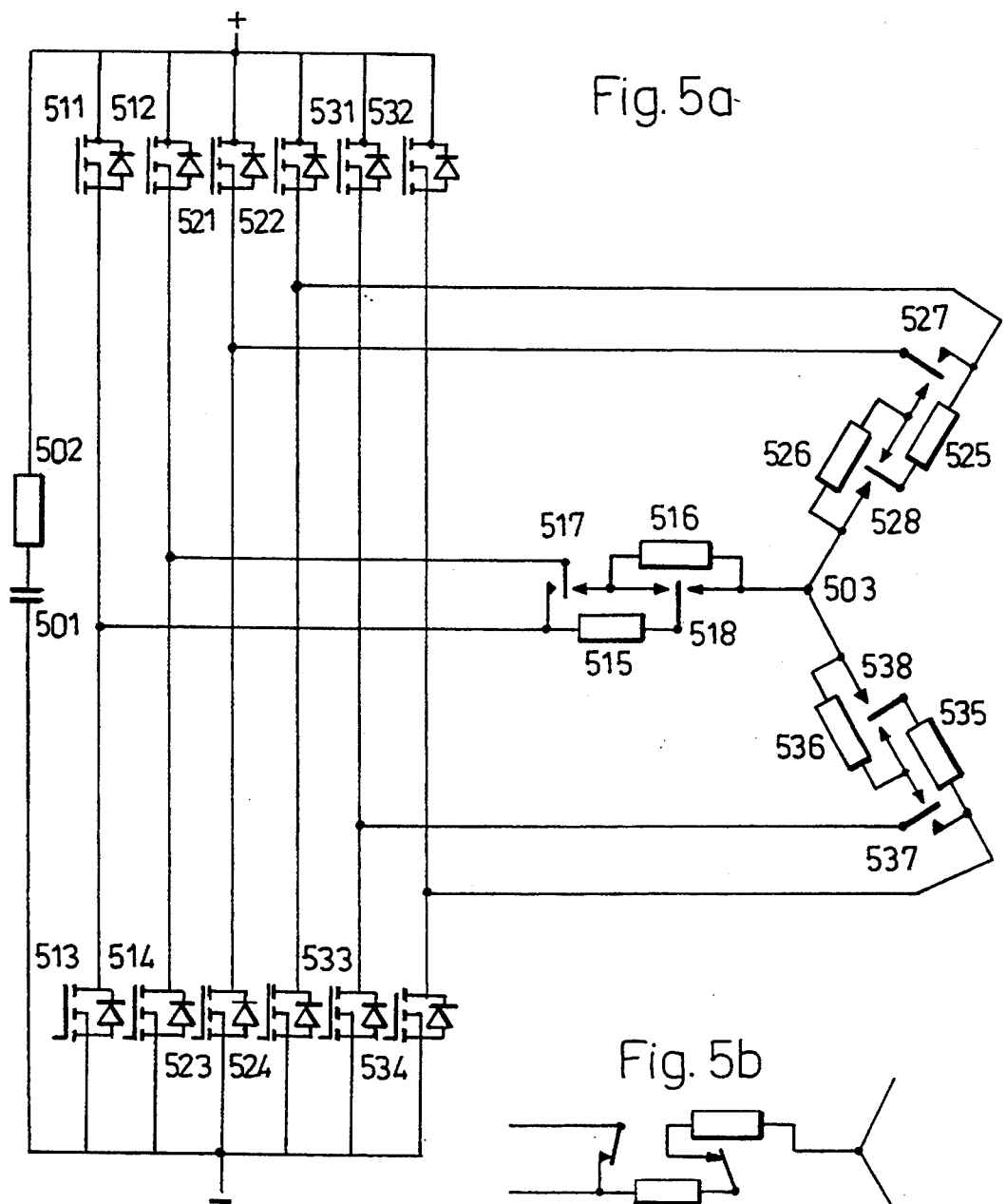
FIG. 5a shows an example of the "electronic gearbox" adapted to a motor according to the invention as shown in FIGS. 1–4 with associated power electronics.

FIG. 5a shows an "electronic gear box" which can be used with the motor as described above and also for any motor which, like the motor shown in FIG. 4a, has each of the windings of its electrical phases divided into two, similar or unsimilar, winding sections like the sections 241–247 and 211–217 for phase 1 in FIG. 4a. The gear box will be described as applied to an electronically commutated, brushless DC motor of the kind described above having three electrical phases.

The phase windings for the motor are assumed to be connected in a star or Y-connection in the conventional way, that is the three phase windings in FIG. 5a are all connected to a common centre or node 503. For each phase there are two winding sections 515 and 516 for phase 1, 525 and 526 for phase 2 and 535 and 536 in FIG. 5a. These winding sections in each phase winding can be connected in two different ways or reconfigured by means of four switching functions illustrated as two singlepole double throw units 517 and 518 for phase 1, 527 and 528 for phase 2 and 537 and 538 for phase 3. These switches like 517 and 518 need not switch live current as a reconfiguration can be done when other switching elements 511–514 are in an off-state and have been in this off-state a sufficiently long time for the winding current to disappear, as will be explained below (FIG. 11).

To avoid a conventional parallel coupling of the winding sections, the number of bridgelegs have been doubled. One such bridgeleg consists of devices 511 and 513. In a conventional three phase inverter like the one shown in FIGS. 4c and 15, there are three bridgelegs. In FIG. 5a there are six bridgelegs each consisting of two MOSFET transistors (performing the inverter switch function) with parasitic internal diodes (performing the freewheeling diode function). The flee-wheeling diodes permit the inductance of the winding to let the current continue when the inverter switches are off. The control system will change from the "on" state shown in FIG. 5e to the "off" state shown in FIG. 5f and back at a frequency of several kilohertz to obtain the average winding current requested. To keep the complexity of the Figures low, the drive circuits and their connections to the MOSFET gates, current sensing components etc. are omitted.

Thus for phase 1 one bridgeleg is connected to one of the winding sections, 515, and a second bridgeleg is connected, at a point between its switches, to the single pole of the first double throw unit 517 for this phase.

This first double throw switch 517 has one of its switching contacts connected to the first winding section 515 at the end of which this section also is connected to the switches 511 and 513 in the first bridge leg. The other switching contact is connected to one end of the second phase winding 516, the other end of which is connected to the centre of the star connection of the motor phases. The second double throw switch 518 has its single pole connected to the other end of the first winding section 515. One of its switching contacts is connected to the one end of the second winding section, where also one of the contacts of the first double throw switch is connected. The other switching contact of the second switch 518 is connected to the centre of the star connection.

Figure 5B:
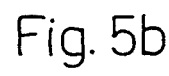
FIGS. 5b and 5c show the interconnection of winding segments for different positions of the configuration switches and FIG. 5d illustrates an interconnection which should be avoided.
Figure 5C:
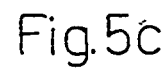

The winding sections 515 and 516 can in this way, by chosing suitable positions for the configuration switches 517 and 518 and suitably controlling the switching times for the semiconductor switches 511-514, be connected in series as illustrated in FIG. 5b or in quasi-parallel as in FIG. 5c. In the series case the winding segments connected in series will then be connected to the centre of two bridgelegs which are connected in parallel. In the parallel case the two winding sections have one end connected to the centre of the star-coupled winding configuration and the other ends are alternatingly connectable (by means of the inverter switches, 511-513) to the positive and negative pole of the electric power source.

Figure 5D:
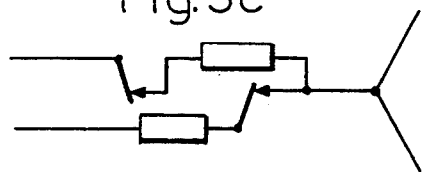

It is important to note that the winding sections 515 and 516 in the quasi-parallel case are connected in a kind of parallel loop but inside the loop also the inverter switches are located. Due to the extremely low winding resistance required to obtain the high efficiency of motors according to the invention and the high stray fluxes caused by its strong permanent magnets, a parallel coupling of windings would cause very high short circuit loop currents which would cause considerable losses. This is illustrated in FIG. 5d, where the induced loop current $I_2$ is higher than the wanted current $I_1$ and is further demonstrated in FIG. 15.

The other two phases are connected in the corresponding way to the electric power by semiconductor inverter switches 521-524 for phase 2 and 531-534 for phase 3.

The positive pole and the negative pole of the electric power source are also connected to each other by large capacitor 501 the operation of which will be described below.

Figure 5E:
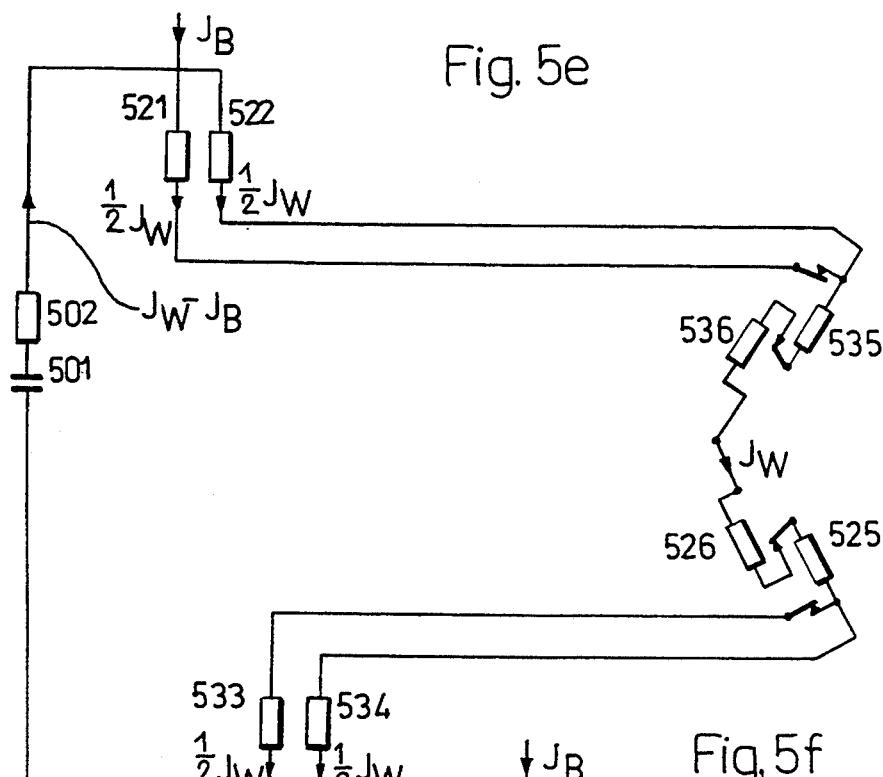
FIGS. 5e and 5f illustrate the currents and losses in a series configuration at the "on" and "off" state of the inverter switches.
Figure 5F:
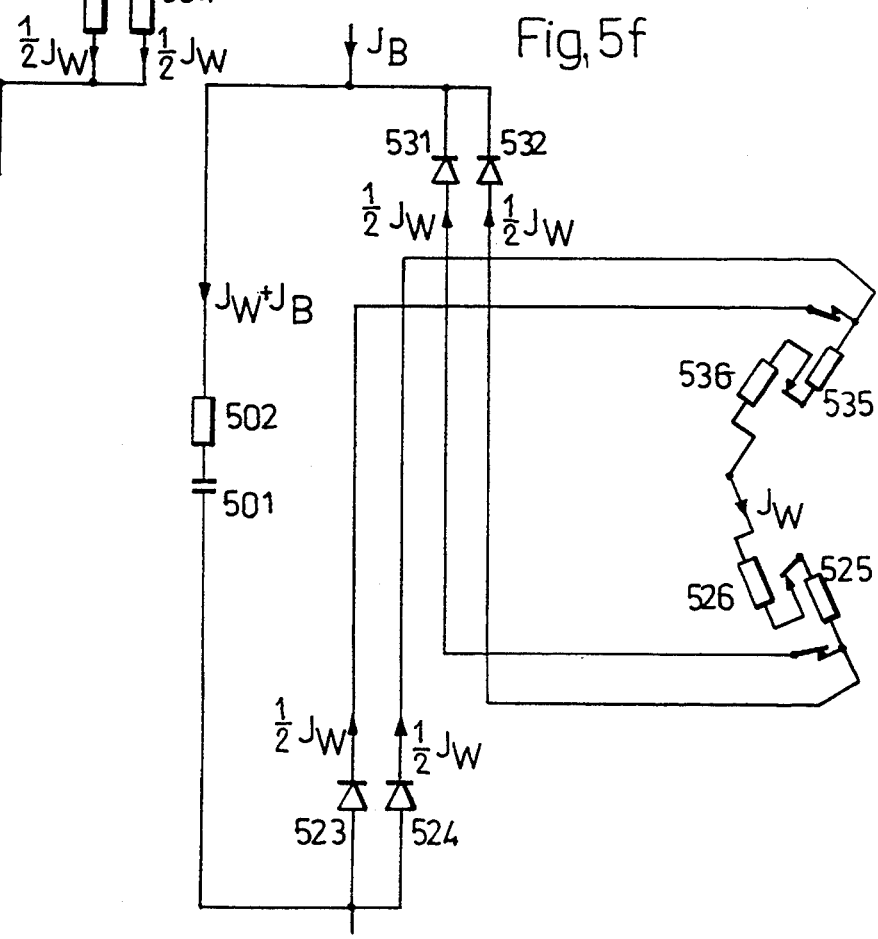
Figure 5G:
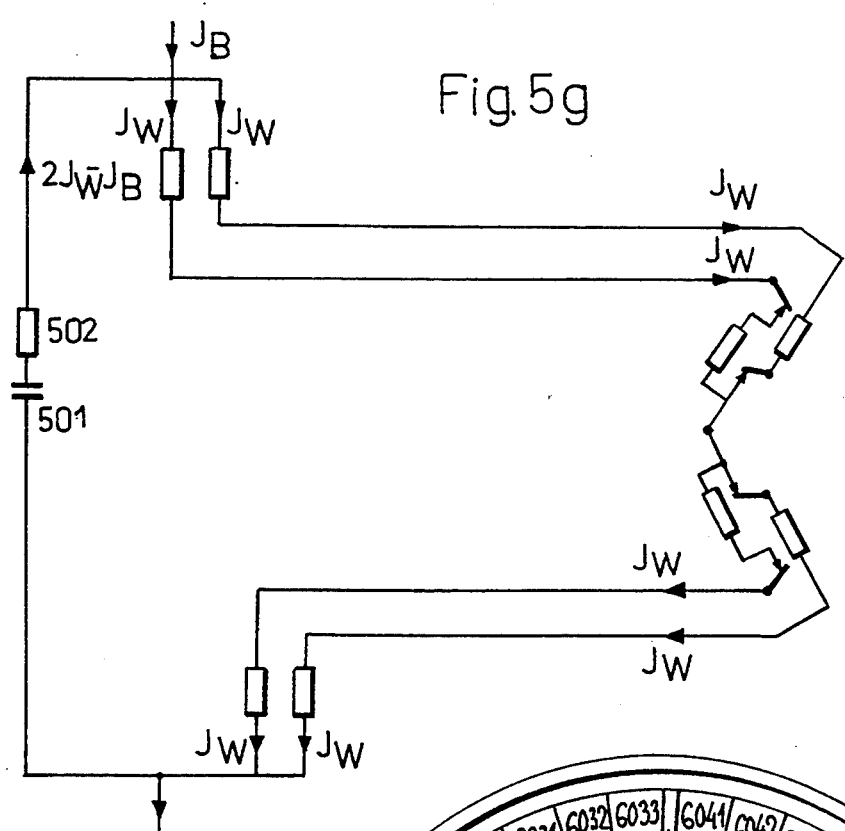
FIG. 5g illustrates the currents and losses in a quasi-parallel configuration in the "on" state of the inverter switches.

FIGS. 5e and 5f illustrate the currents and some loss creating elements while operating with the low speed configuration according to FIG. 5b, and FIG. 5g illustrates the "on" state of the high speed configuration corresponding to FIG. 5c. To facilitate reading, only the current carrying elements and paths are included. The layout of the components in the Figure is identical to that in FIG. 5a. The FIGS. 5e-5g illustrate the conditions at a time when the rotor is positioned in a way that has caused the inverter control logic to use the windings 535, 536 and 525, 526 of phases 3 and 2.

FIGS. 5e and 5f illustrate the state where the semiconductor switches 521, 522, 533 and 534 are on. The inverter switches are illustrated with their ON resistance. The winding current required to obtain the torque required is denoted $I_W$.

As can be seen by comparing FIGS. 5e and 5g, each inverter switch like 521 and 522 in FIG. 5e will carry only half of the winding current ($I_W/2$), while those in FIG. 5g carries the whole winding current ($I_W$). In the case of MOSFET switches, this will reduce their on losses with 75% ($P=RI^2$; R constant).

FIG. 5f shows the same configuration as FIG. 5e at a point in time when the inverter switches are off. The free-wheeling diodes accociated with the semiconductor switches like 531 are illustrated as diodes. The winding current $I_W$ is the same as in FIG. 5e. Again, only half of the winding current passes each element like 531, which will reduce the losses in the free-wheeling diodes during the off-time of the switches with (more than) 50% ($P=U*I$; U almost constant but increases sligthly with increasing I).

In FIGS. 5e and 5f it is assumed that the capacitor 501 is so big that the battery current $I_b$ can be simplified to be basically constant during the inverter switch cycle (the inverter is alternating between the state of FIG. 5e and 5f at several kilohertz). The high frequency component of the current through switches like 531 is then supplied by the capacitor 501. A 50% reduction of the switch current will cause a similar reduction of the capacitor RMS current, thus reducing the losses over the capacitor inner resistance 502 with some 75% ($P=RI^2$; R constant). In a more general case, the high frequency component of the current through switches like 531 is supplied by a power source (which may be the capacitor 501 and a battery in parallel). A 50% reduction of the switch current will cause a similar reduction of this AC current, thus reducing the losses over the total source inner resistance with some 75%.

The 50% lower total current through the switches in FIG. 5e compared to FIG. 5g will cause approximatively 50% lower switching losses in the switches 521, 522, 533 and 534 during the transitions to or from the state shown in FIG. 5f from or to the state of FIG. 5e. (This is obtained by using a rough approximation: the switching loss $P=k*U_{supply}*I_{diode}*f$ where k depends on the circuit design, $I_{diode}$ is the diode current like $I_W/2$ in FIG. 5f and f is the switching frequency.)

During high speeds the configuration according to FIG. 5c is selected. The EMF of all phases (as seen from the switches 517 etc.) will now be reduced by 50%. This permits the phase windings to be designed for twice the voltage otherwise possible. This will permit a smaller winding wire diameter, thus reducing eddy currents and losses inside the windings. FIG. 5g shows a state where both switches 521-522 and 533-534 are "on" simultaneously. This will be the case if the control unit (i.e. 1103 of FIG. 11) always gives identical control signals to similar switches in all bridge legs of the same phase, for example to switches 521–522. In motors like the one shown in FIGS. 4a–4b this normally gives acceptable results as the winding current induced fluxes circumvented by the two winding sections are almost totally independent of each other. The winding segemt 526 can therefore respond to the voltages imposed by the switch 521 by accepting a winding current change suitable to obtain an EMF which will permit a low "on" voltage over switch 521, and it can do this independently of the EMF delivered by the winding segment 525 (as can be seen in FIGS. 4a and 4b, the coils of the two winding segments are far apart, and current in the coils 561–567 of the segment 526 will hardly create any flux in the coils 531–537 of segment 525).

It is also possible to let the switches 521 and 533 be "on" independently of the switches 522 and 534. During time intervals when one of these switch pairs is "off" and the other pair is "on", the current $I_W$ taken from the positive rail from the "on" switches will be supplied from the free-wheeling diode of the "off" switches, thus reducing the AC current in the capacitor 501 and in the power supply.

When configured for low speeds as in FIG. 5e, the inductance of the four sections 525, 526, 535 and 536 will be connected in series. The EMF of the four sections will also be connected in series. The motor in an electric vehicle will in most cases drive the car, that is act as a motor and convert electric energy to mechanical energy. In such cases the configuration shown in FIG. 5e will give a lower difference between the battery voltage and the total winding EMF while the semiconductor switches like 511 are on. The lower voltage difference driving a higher inductance will give a slower current increase in the winding. This permits a lower switching frequency or a lower current ripple. A lower switching frequency results in lower switching losses, and a lower current ripple results in lower losses in the windings, switches and power supply (i.e. capacitor and battery) inner resistances.

Figure 6B:
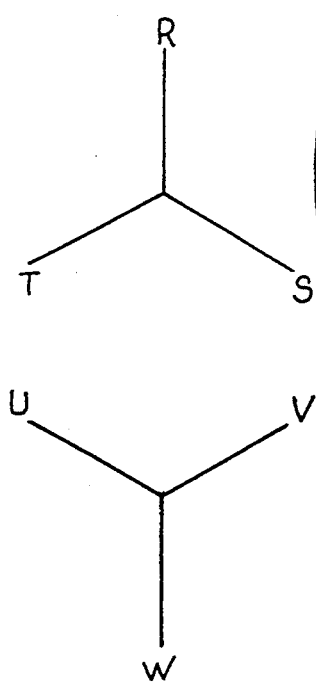
Figure 6A:
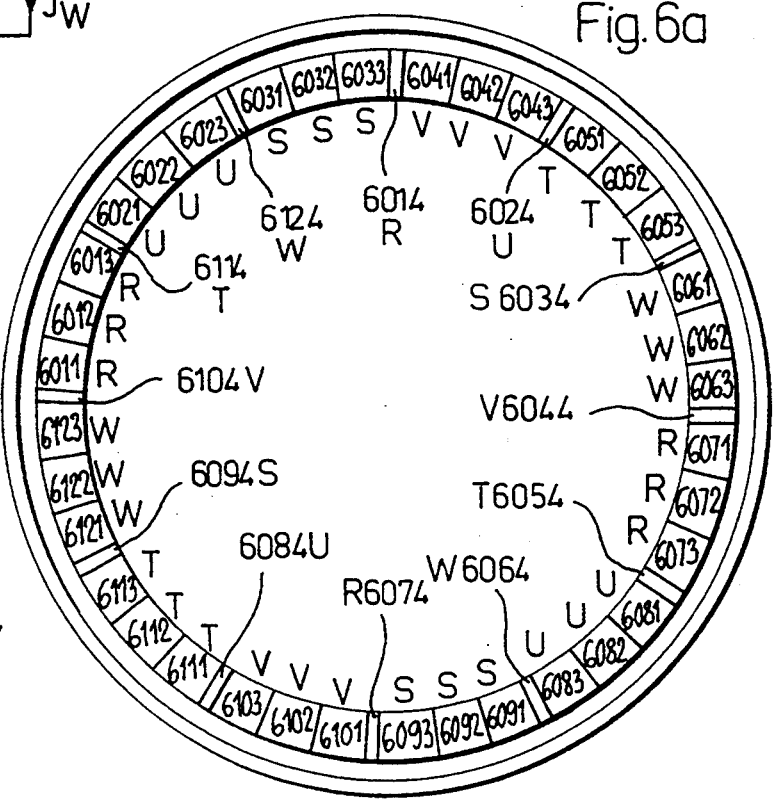
FIG. 6a schematically shows the winding coils of an exemplary embodiment of the motor according to the invention having six phases, three main poles per pole group and a flux balancing pole width of 1/6.

FIG. 6a shows schematically the windings of a motor similar to the one shown in FIGS. 1, 2 and 3. In this case the motor has six electrical phases, each with 2 pole groups with 3 main poles each. The six phases are 60 electrical degrees apart and can be connected as two Y-connected three phase systems like the one in FIG. 5. These two systems are illustrated as one system R-S-T, phases 1–3, and another system U-V-W, phases 4–6, in FIGS. 6b and 6c where the respective voltages are illustrated as vectors. Poles located on the same diameter have windings which belong to the same electrical phase. The poles 6011, 6012, 6013, 6014 and 6071, 6072, 6073, 6074 belong to one of these six phases, for example phase R. The coils 6031–6034 and 6091–6094 could then constitute phase S, the coils 6051–6054 and 6111–6114 could then constitute phase T, the coils 6021–6024 and 6081–6084 could then constitute phase U, the coils 6041–6044 and 6101–6104 could then constitute phase V, and the coils 6061–6064 and 6121–6124 could then constitute phase W.

The flux balancing poles have in this embodiment a width of 1/6th of the main stator pole pitch. In FIG. 6a the possible windings around the flux balancing poles are indicated as the windings 6014, 6024, etc. The rotor flux through the optional coils 6014 and 6074 of the flux balancing poles of phase 1 are useful at the same time as the coils 6011–6013 and coils 6071–6073 of the main poles are active, and can as is illustrated—if used—thus be connected to the same phase as the windings 6011–6013 and 6071–6073. The rotor has in this embodiment 38 poles.

If the motor according to FIG. 6a is run using two inverter systems like the one in FIG. 5a connected as in FIG. 5c, the no load voltage at a given speed would be only 25% of the no load voltage of a motor according to FIG. 4 with all coils in the same phase connected in series in the conventional manner. This could either be used to reduce the battery voltage to ¼th, or to increase the number of turns in the coils like the coil around pole 212 in FIG. 2 four times, thus reducing the wire diameter to approximatively ½. This permits lower copper eddy currents and thus lower losses.

The economically rewarding implementation of the electronic gear box according to the invention requires switches with acceptable prices, volumes and on resistances. As is obvious from FIG. 5a and FIG. 11, the switches like 517 and 518 can be set from the state shown in FIG. 5b to the state of FIG. 5c while the twelve semiconductor switches 511 etc. are switched off. This puts lower requirements on the configuration switches like 517.

Figure 7A:
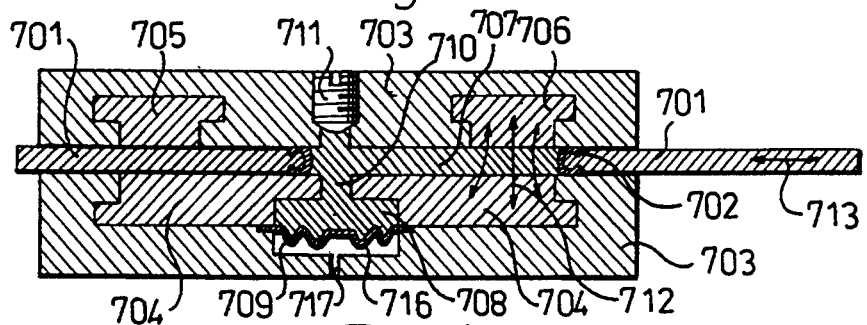
Figure 7B:
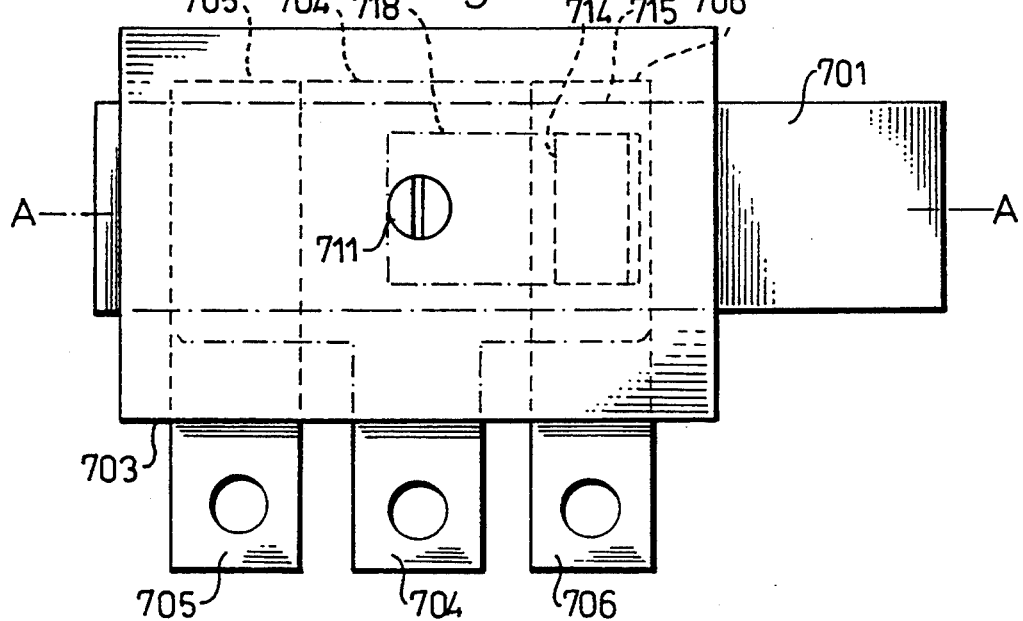

FIGS. 7a and 7b show an embodiment of a sliding switch intended for the winding switch system shown in principle in FIG. 5a. FIG. 7a is a section according to A—A in FIG. 7b. The switch consists of a slide 701 which has an optional seal 702 and is movable in the direction left-right as seen in the Figure in a house consisting of a not mercury-wettable, nonconducting material 703, the switch common pole 704 and alternating poles 705–706. The contacting sliding element 707 consists of a conducting fluid. This can be mercury, some suitable amalgam like 92.7% mercury, 7.2% silver and 0.1% palladium or 92% mercury and 8% thallium, or some other conducting fluid. In this description the word mercury is used for the contacting fluid in order to make the text easier to read. The inventive switch concept is however not limited to pure mercury as the conductive fluid.

The mercury body acting as sliding connector 707 is in fluid communication with a cavity 708 loaded by a spring 709 through a channel 710 in the electrode 704. One side or a portion thereof defining a mercury containing cavity such as the cavity 708 is constituted by the spring 709 which generally is plate shaped and is made from an elastic material such as a suitably coated spring steel or nickel. The spring 709 may be a circular disc having some means for improving its elasticity such as circular corrugations 716 concentric with the periphery of the disc 709. The other side of the spring 709 not facing the mercury is connected, in this embodiment, to the atmosphere (channel 717) and thus part of the spring, that is the inner portions thereof in the embodiment shown, are free to move while the marginal portions of the spring are secured to and seated to the housing 703 or the electrode 704. The spring may, for instance, be located between a part of an electrode and the housing 703 and retained by a clamping action effected by these parts against the margin of the spring 709.

The spring loaded volume, inside 708, will then enable the mercury to maintain a reasonable constant pressure regardless of the temperature shifts and associated volume changes in the different parts of the mercury filed cavities. A plug 711 seals the mercury cavities, after filling. When filling the mercury cavities this may be performed in such a way that no air or other compressible fluid will be introduced into the cavities. Also the filling of mercury must be made to some excess, that is in such a way that there will be an overatmospheric pressure inside the mercury cavities, when the cavities are finally sealed by the plug 711. This will make the spring 709 bend a little outwards in order to have its elastic forces act on the mercury.

The direction of current in the switching section of the switch is illustrated by arrows 712 on the "on" side of the switch. This current direction is perpendicular to the mechanical movement of the slide 701, which is illustrated by the arrow 713.

FIG. 7b shows the exterior of the switch as seen from above. The hidden parts of the electrodes 705 and 706 are drawn using broken lines and the common electrode 704 using a broken dotted line. The hidden part of the slide is illustrated by the broken line 715. The (hidden) wetted surface of electrode 706 is illustrated by the dotted line 714 and the hidden borderline of the opening 707 in the slide 701 by a broken dotted line 718. Assuming that the area 714 is 3×6 mm and the distance between the electrodes 704 and 706 is 1 mm, the resistance of the mercury conductor will be approx. 0.06 mOhm and the used mercury. volume some 0.06 ml.

The slide 701 is a plate-shaped or rod-shaped member having two large parallel surfaces and it is arranged to move in a bore inside the housing 703. The mercury is located in a hole through the slide passing from one large surface to the other. The seal 702 is then attached to the sides of the through-hole. Suitable areas of the sides of the bore will then be constituted by the electrodes 704, 705 and 706, these areas also being located at the large interior surfaces of the rectangular bore or channel which correspond to the surfaces of the slide 701.

The electrodes 704–706 can be made using knowhow already being applied in the design of mercury contactors, mercury wetted contacts in relays, contact thermometers etc. Examples are nickel with rhodium plating towards the mercury, nickel-iron alloys or copper plated by nickel and rhodium.

FIGS. 8a–8c and 8d–8g respectively show two other arrangements suited for the "electronic gear box" using 3 and 4 sections of the winding of each phase. Only the windings for one phase are illustrated (corresponding to the phase having the windings 515–516 in FIG. 5a).

Figure 8A:
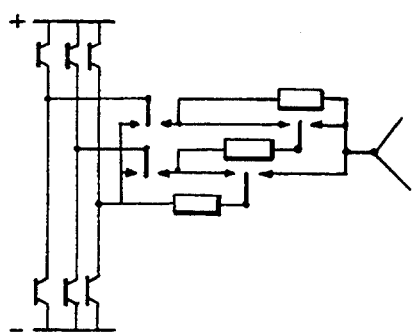
FIG. 8a shows an alternative connection of phase sections in an "electronic gearbox" and FIGS. 8b and 8c show the resulting winding configurations.
Figure 8B:
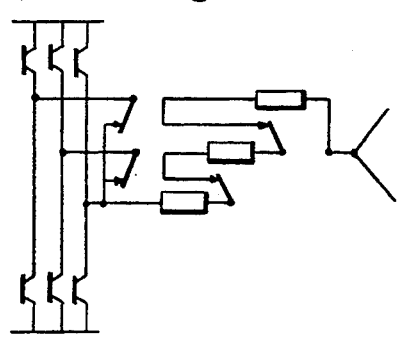
Figure 8C:
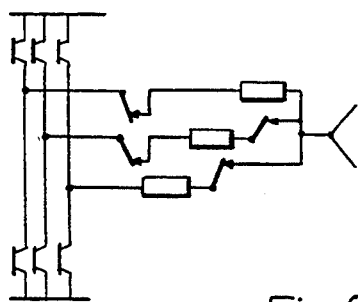

In FIG. 8a there are 3 winding sections 801, 802 and 803 and therefore three semiconductor switches 804 on the positive rail (corresponding to switches 511 and 512 in FIG. 5a) connected to the positive pole of the power source and three semiconductor switches 805 on the negative rail. Setting all four configuration switches 806–809 as shown in FIG. 8b will cause all the winding sections 801–803 to be connected in series. Setting the configuration switches 806–809 as shown in FIG. 8c will cause the winding sections to be connected in quasi-parallel in a manner equivalent to that illustrated in FIG. 5b. This gives "gear ratios" of 1:1 and 1:3. The same pattern can easily be continued to a number of n winding segments and corresponding "gear ratios" of 1:1 and 1:n.

Figure 8D:
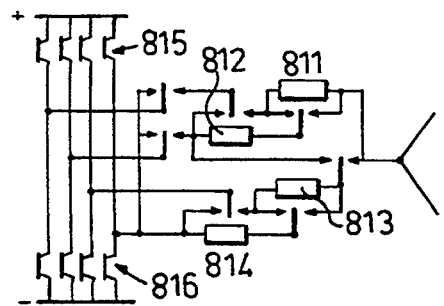
FIG. 8d shows another alternative connection of phase sections in an "electronic gearbox" and FIGS. 8e, 8f and 8g show the resulting winding configurations.
Figure 8E:
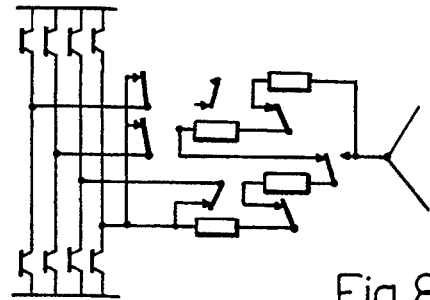
Figure 8F:
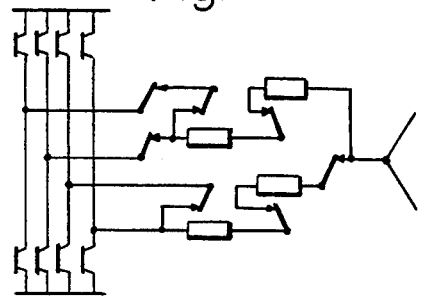
Figure 8G:
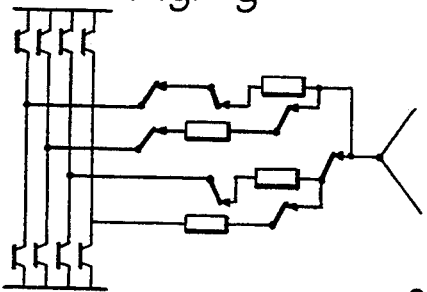

In the case illustrated in FIG. 8d each phase has 4 winding sections 811–814 and therefore 4 semiconductor switches 815 on the positive rail and 4 switches 816 on the negative rail. Setting the configuration switches as shown in FIG. 8e will cause the winding sections 811–814 to be connected in series (the setting of switch 817 is in this case irrelevant). Setting the configuration switches as shown in FIG. 8g will cause the winding sections to be connected in quasi-parallel, analogous to the case illustrated in FIGS. 5c and 8c. Setting the configuration switches as shown in FIG. 8f will cause the winding sections to be connected in two quasi-parallel groups, each having two sections in series. This permits three "gears", 1:1, 1:2 and 1:4.

In FIG. 8e all four winding segments are connected in series. This case is suitable for low speed operation corresponding to the first gear of a conventional car gear box. As the EMF of the four winding segments in each phase are added, even a low speed (like 22.5 km/h in the embodiment example above) will give a high EMF of some 160 volts (for a motor similar to the one shown in FIG. 1 and 2). This corresponds to a high motor RPM at a low speed when using the first gear in a conventional car. The current from the power supply will pass all the four winding segments of two phases, and therefore each Ampere of inverter output current will create a torque eight times. Even a moderate power supply current like 136 A (34 A for each of the switches 815 or 816) will give each wheel motor of the example a traction force (before road friction losses etc.) of 1420 Newton. Four motors therefore give a total of almost 6000 N (enabling an ideal acceleration of 4 m/s2 for a 1500 kg car).

Like the first gear of a conventional car gear box, connections according to FIG. 8e give a high traction force but limit the top speed.

In FIG. 8g all winding sections of each phase are connected in parallel. This corresponds to the third gear in a conventional (three gear) gear box and gives the example motor an EMF of 160 V at 90 km/h. The input current from the battery and AC current from the capacitor will be split between the four windings. If in this case all switches 815 and 816 carries 34 A each, the resulting traction force will be only some 400N per motor or 1600N for the whole car.

FIG. 8f shows a configuration corresponding to the 2nd gear of a conventional gearbox. If in this case all switches 815 and 816 carries 34 A each, the resulting traction force will be some 800N per motor or 3200N for the whole car.

The terminal voltage of each motor will be the same 160 V for 22.5 km/h using the configuration of FIG. 8e, 45 km/h for FIG. 8f and 90 km/h for FIG. 8g.

When all four windings are in parallel as in FIG. 8g, the total inductance will be far lower than in FIG. 8e. This gives some advantage, as this will reduce the problem of forcing currents into new windings when the speed is high and the windings used by the inverter therefore are changed often. It also gives some disadvantages as the switching frequency for a given ripple current must be increased.

The "electronic gear box" thus will reduce losses in a system by
- Lower inverter switch conduction losses due to lower semiconductor switch currents for the same winding current
- Lower inverter free wheeling diode losses due to lower diode currents for the same winding current
- Lower inverter switch switching losses due to lower inverter power semiconductor currents for the same winding current and a possibility to use lower switching frequency
- Lower losses due to lower AC currents in the power source inner resistance for the same winding current Lower losses due to a possibility to use lower ripple currents Lower losses due to thinner winding wire for a given supply voltage and therefore lower eddy currents in the windings.

Figure 9:
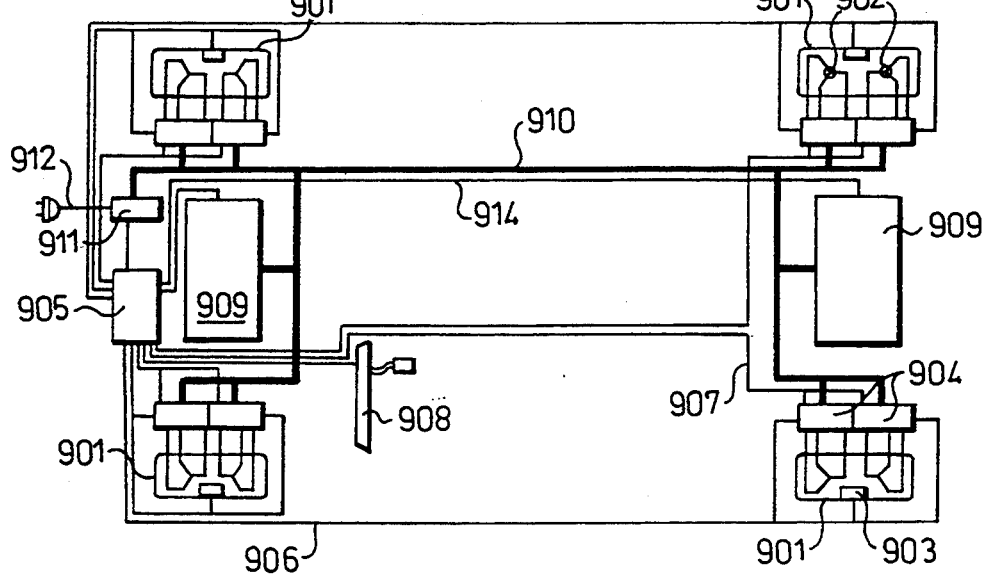
FIG. 9 shows schematically a drive system and a power train for a vehicle using the motor and "electronic gearbox" according to the invention.

FIG. 9 shows an example of the above described constructions installed in an ordinary motor car. There are four wheels 901, each having an internal motor for example as shown in FIG. 1 with a stator and coil arrangement 902 for example as shown in FIG. 6a. On FIG. 9 the two Y-connected triplephases are drawn separately. Mechanically, they are of cource concentric as shown in FIG. 6a.) For each motor there are two inverters 904, for example as shown in FIG. 5a. Information concerning the angular position of the rotors is obtained from the transducer 903 and is sent to the inverters 904. It is also sent by cable 906 to the central control unit 905, which can use this information to limit the top speed of spinning wheels on slippery surfaces and to avoid locking of wheels during braking. The additional cost to implement such functions is almost negligible. The command signals relating to desired torque and switch setting are sent from the central control unit 905 through cables 907 as a response to commands given by the driver through the usual pedals, control panel etc. 908. The power is in this installation delivered by two batteries 909, which could be size B240 sodium sulphur units proposed by Asea Brown Boveri. The source of electric power is irrelevant for the invention; the high efficiency of the invention is however more beneficial if the energy obtained during braking can be stored. The power line is illustrated as the cable 910. Charging is done by an on board charger 911 using single- or three phase power from the cable 912. For battery management and charge control there are extra control cables 913 and 914. (Mechanical brakes, motor cooling units, local 12 V electric systems etc. are omitted in FIG. 9.)

Figure 10:
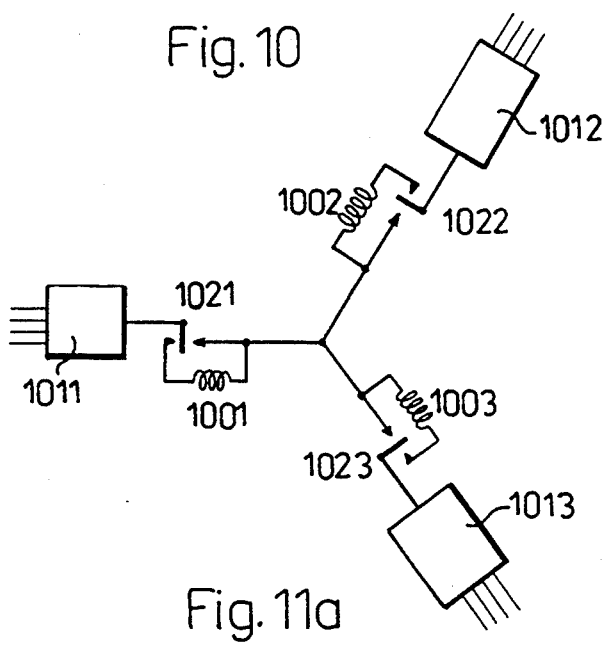
FIG. 10 shows a configurable series inductance for each phase.

FIG. 10 shows an arrangement giving the possibility to add a series inductances 1001-1003 in series with the motor phases when required. The boxes 1011-1013 represents reconfigurable winding segments as shown for example in FIGS. 5 or 8. By changing the switches 1021-1023 (while the winding segments do not carry current), the inductances 1001-1003 can be included or excluded.

Figure 11A:
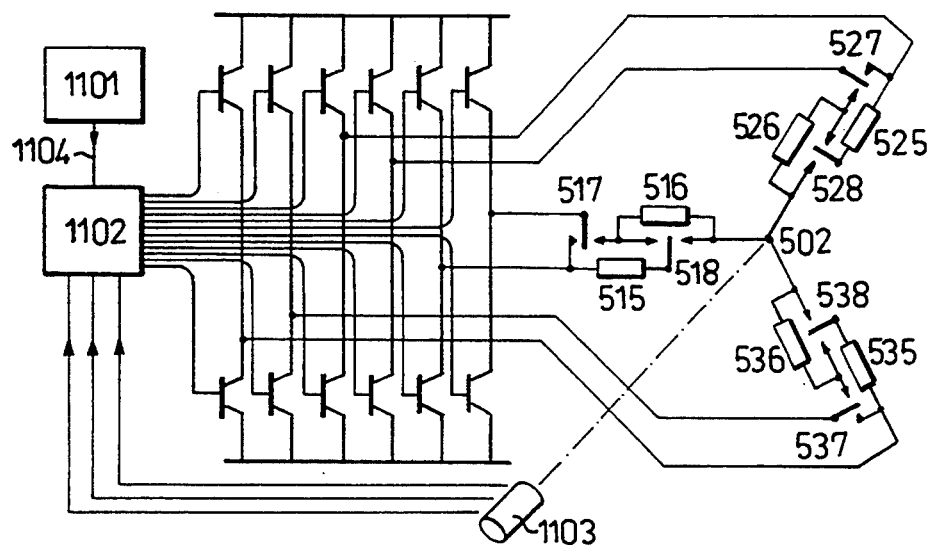

FIG. 11a shows a more complete schematic of a motor-inverter system as shown in FIG. 5a. The unit 1101 gives a pulse train 1104 shown in FIG. 11c. The pulse train is sent to unit 1102. This unit will use information from the rotor angular transducer 1103 (which could be the Hall elements 112 of FIG. 1) to select which four of the 12 transistors should be switched on during the "on" time commanded by the pulse train from unit 1101.

Figure 11B:
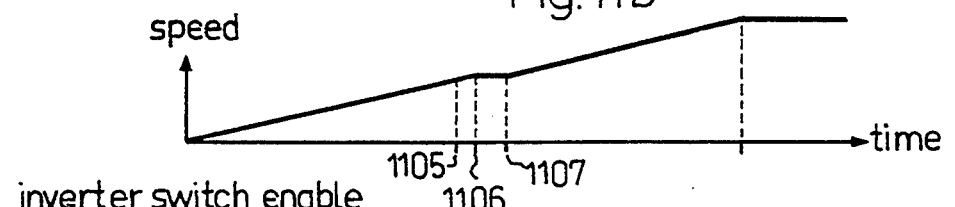
FIGS. 11b–11d lid show a time diagram of settings of the switches in the embodiment shown in FIG. 5a during an acceleration phase.
Figure 11C:
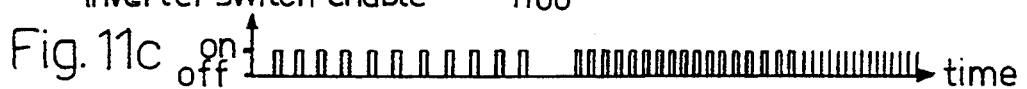
Figure 11D:
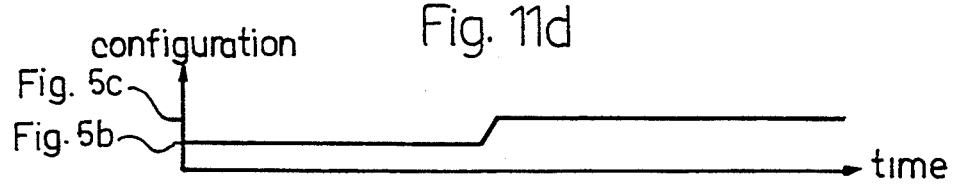

The FIGS. 11b-11d shows an acceleration from zero. At the time 1105 in FIG. 11b the speed as seen in FIG. 11b has increased to a value where a reconfiguration should take place. The pulse train from 1101 is then halted. At some time 1106 the magnetic energy in the windings has been depleted, the accelerations stops and the configuration switches can be reconfigured to the state shown in FIG. 5c. This is shown in FIG. 11d. When this is accomplished at some time 1107, the pulse train will continue.

The 1101 pulse train frequency is adapted to the inductance of the configured winding. As the inductance after time 1105 is lower, the pulse train frequency is increased.

The advantages of a power train as shown in FIG. 9 will be shortly summarized.

The motors according to the invention permits much lower losses for a given traction output than the motors used in prior an power trains. The high efficiency and high torque of the motors according to the invention combined with their low mass and acceptable dimensions permit the insertion of motors in the rims, thus eliminating almost all losses of the gears and other transmission means in prior an powertrains (17% for the ETX-II quoted above). It also releases space and permits the arrangement of large battery units between the wheels. The inverter arrangement according to the invention permits lower losses in various components in the inverter and better use of expensive silicon area thus permitting either cheaper and smaller—or more efficient—inverters.

FIG. 12 shows an embodiment of a single pole dual throw sliding switch according to the invention. It consists of a nonconducting slide 1201 with a mercury wettable, conducting electrode pan 1202. The slide is movable in the direction left-right as seen in the Figure in a house consisting of a nonconducting material 1203, the switch common pole 1204 and alternating poles 1205-1206. The contacting surface of the electrodes 1204-1206 consists of mercury. The mercury bodies acting as electrode surfaces 1207 are connected to cavities 1208 loaded by a spring 1209 through a channel 1210 in the electrodes. The spring loaded volume inside 1208 enables the mercury to maintain a reasonable constant pressure regardless of the temperature shifts and associated volume changes in the different parts of the mercury filled cavities.

The shape of the slide 1201 and the housing 1203 may be principally as that shown in FIGS. 7a and 7b.

FIG. 13 shows an alternative embodiment of a slide with a moving mercury contact to be used in embodiments like the one shown in FIGS. 7a and 7b. The dielectric slide material 701 has an opening into which is inserted a mercury wettable metal part 1301 with holes or perforations 1302 to permit the mercury 1303 to flow from the upper to the lower side when required to maintain equal pressure against the walls of the housing (703, 704, 705, 706 in FIG. 7). A seal with an elastic cylindrical element 1304 like a rectangular O-ring is provided.

The combination of a slide like the one shown in FIG. 13 (but without the seal 1304) with electrodes like those shown in FIG. 12 gives a switch in which the switching action is obtained by uniting or separating the moving mercury body 1303 and the static bodies like 1207. The bodies are always in contact with the mercury wettable surfaces of spacer 1301 and electrodes 1204, 1205, 1206.

FIGS. 14a-14c show a two pole double throw switch similar to the embodiment of FIGS. 7a and 7b intended for the application of FIG. 5a. The electrodes are similar to those shown in FIG. 12 but the slide has simple cavities like the one of FIGS. 7a and 7b. The switch is shown in FIG. 14b as seen from the above. A section A—A is shown in FIG. 14a. A reduced scale picture in FIG. 14c shows the switch as being used for one phase of the inverter according to the invention shown in FIG. 5a. There are eight mercury electrodes, six of which consist of double electrodes 1402, 1403 and 1404 each having one terminal tab and two single electrodes 1401 and 1405 each having two terminal tabs. Mercury is shaded in FIG. 14a. The mechanical layout is arranged to permit a simple cabling if inserted inside a motorized wheel like in position 132 of FIG. 1. The connections to the coils are on one side and the connections to the Y common point and the external bridgelegs are located on the other side of the switch housing 1402.

Figure 15A:
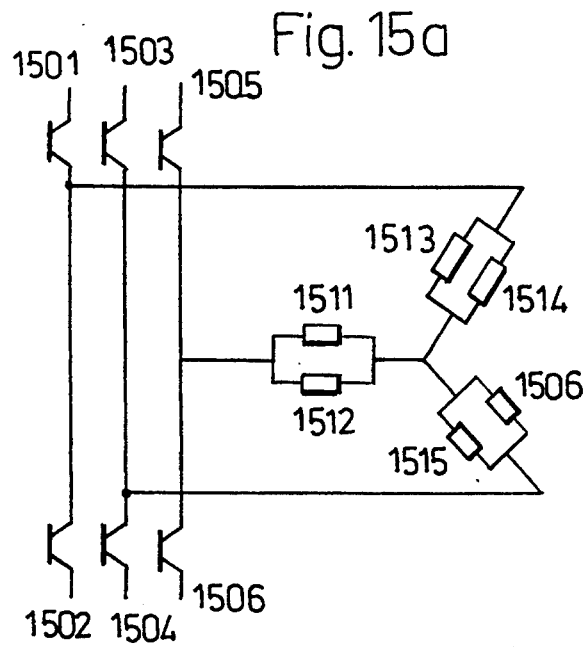
FIGS. 15a–15c illustrate one example of short circuit currents caused if conventional parallel coupling of windings would have been used in motors like the one shown in FIGS. 2–4.
Figure 15B:
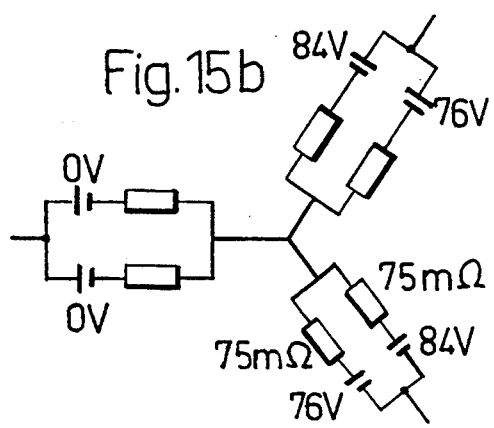
Figure 15C:
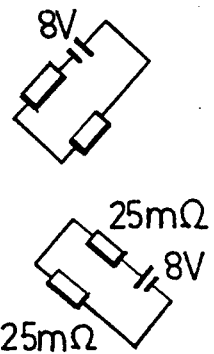

FIG. 15a–15c illustrates one of the problems that will be obtained if parallel coupled windings are used in motors with very low winding losses like the motor shown in FIGS. 1 and 2. Each phase winding is divided into two sections, which are connected in parallel. The motor according to FIGS. 1 and 2 may for a speed of 90 km/h (approx. 55 mph) have an EMF of approx. 80 V in each winding segment. The parts comprising the motor according to FIG. 1 and 2 have manufacturing tolerances, giving EMF voltage differences. The width of the airgap 101 and the strength of permanent magnets 202 are important factors for the EMF. FIG. 15b and 15c illustrate a case where such tolerances give a voltage EMF difference of $+5\%$ for the sections 1513 and 1514 and $-5\%$ for sections 1515 and 1516. At the point of time described, the EMF of sections 1511 and 1512 are zero and no load current is imposed (all six switches 1501–1506 have been off for some time). The circuit of FIG. 15a can in this case be simplified to that in FIG. 15b. The two counteracting EMFs of 84 and 76 V can be replaced with a single net EMF of 8 V as shown in FIG. 15c. The loop current induced will in this case dissipate $8 * 8/0.050 = 1280$ W for each phase. As each motor has 2 dissipating phases and a passenger car (as shown in FIG. 9) have 4 motors, the total dissipation would in the illustrated case be 10240 W, which is approximatively the same as the mechanical power required to drive a medium class passenger car in 90 km/h on a flat road.

The assumtions used for the calculation of loop current losses in FIGS. 15a–15c are made to simplify the illustrative case. This case is however representative even if load currents are imposed from the inverter; the difference current will flow anyway and losses will be the same. If the EMF of the third phase segments 1511 and 1512 are different from zero and unequal, also the third phase will create loop currents and thus contribute to the loop current losses.

Low resistance motors like the one shown in FIG. 1 and 2 have strong magnetic fields created by the permanent magnets. The leakage flux through the windings is considerable, and will cream unwanted EMFs in parallel coupled windings. This will add another source of loop currents.

Parallel coupling of winding segments will therefore easily create unacceptable losses in low resistance motors.

As is obvious to anyone skilled in the art, the electric motors as described above may undergo changes and modifications within the inventive concepts.

The stator part can alternatively be placed outside the rotor as in a conventional motor. As the stator part often can be made rather thin as is the case in FIG. 2, an external stator motor can be made with almost the same airgap diameter as an internal stator motor with the same total motor diameter.

The number of poles in each group as well as the number of pole groups in each phase can take many different values; it is however often desirable to have an even number of polegroups for each phase as this will reduce the radial load on the bearings. The number of phases and the width of the flux balancing poles can be changed to fit various requirements. The part of the periphery used by permanent magnets can be adjusted. The angular position information that in FIGS. 1 and 2 is obtained from Hall sensors 112 can be replaced with other types of sensors or transducers.

The motors need not necessarily be installed inside the rims. They can alternatively be fastened in the car body, using flexible couplings, gears or other mechanical means to transfer the mechanical energy to the wheels. Such additional elements do however add weight and losses.

Normal precautions to reduce cogging torque like slightly skewing the laminated iron sheet composing the stator can be applied.

As is obvious to anyone skilled in the art, the invertermotor designs as described above may undergo changes and modifications within the inventive concepts.

The illustrated example in FIG. 5 uses MOSFET devices as the switching element and a bridge leg configuration using the MOSFET parasitic diode as freewheeling diode. The inventive concept can be used with other switch types, e.g. Bipolar Junction Transistors, Bipolar Modulated FETs, Bipolar Darlingtons, Insulated Gate Bipolar Transistors and Thyristors. The simple bridge leg configuration can be replaced by others using series blocking diodes, unsaturable or saturable inductors, unsaturable mutual inductances or other bridge leg circuits used in conventional inverters with non-reconfigurable windings. For examples, see SGS Thomson Power Modules Data Book, 1st edition, pps. 32 ff. and 131.

The shown embodiments use double throw switches. These can be replaced with (a higher number of) single throw switches or other switch configurations.

The shown embodiments are using conducting fluid switching elements for the winding reconfiguration. Other switching elements may be used within the inventional concept.

The shown embodiments have three phases. Other numbers of phases are within the inventional concept.

In the shown embodiment all winding sections are used in all configurations. The inventive concept includes other schemes, where in some configurations some winding segment is unused. For example, three segments can be configured as 1) all in quasi-parallel, 2) all in series and 3) only two in series, the third being disconnected.

In the shown embodiments the configuration switches are galvanic. In principle, semiconductor switches, for example triacs, could be used. Present semiconductor technology does not yet seem to offer switches with price/performance/size data competetive with fluid conductor switches according to the invention.

I claim:
1. An electric apparatus, comprising:
    a field magnet having different magnetic poles included in the field magnet, the different magnetic poles formed alternately at an equal spacing;
    an armature having an armature core and armature windings, the armature core including protruding first and second poles, each of the first and second poles having ends, the different magnetic poles included in the field magnet arranged to oppose the ends of the first and second poles;
    electrical windings wound on each one of the first poles, the electrical windings electrically connected to one phase of a multiphase electrical power source, the field magnet and the armature being arranged to move in complete successive rotations in relation to each other such that a gap is maintained between the poles of the field magnet and the poles of the armature, the first poles arranged in pole groups such that the windings of the poles in a pole group are connected to a same electrical phase, each pole group including at least two first poles, each pole in a pole group located immediately adjacent to another pole of the same pole group, and when more than one pole group is connected to an electrical phase, located therebetween is at least one other pole group the poles of which are connected to a different electrical phase, the pitch of the poles in a pole group being equal to the pitch of the magnetic poles of the field magnet;

the second poles operative as flux balancing poles, the flux balancing poles not belonging to any pole group, the flux balancing poles arranged such that a flux density over the surface of the permanent magnets is relatively even, each one of the flux balancing poles being arranged adjacent to and between first poles in two adjacent pole groups, the flux balancing poles having one of no windings and windings having a lower number of turns than a number of turns of the windings belonging to first poles in pole groups.

2. The electric apparatus of claim 1, wherein portions of the armature poles which face the field magnet extend only in the direction of and opposite to a direction of movement direction, such that gaps between said portions belonging to adjacent armature poles are gaps being small in relation to the width of said portions in the movement direction.

3. The electric apparatus of claims 1 or 2, wherein all pole groups contain the same number of first poles.

4. The electric apparatus of claims 1 or 2, wherein a pitch length of slots on opposite sides of at least one flux balancing pole is different than a pitch length of the first poles in the pole groups.

5. The electric apparatus of claims 1 or 2, wherein a pitch length of the flux balancing poles is substantially equal to the product of a and (n/p), where n is a small natural number having no common factors with a number of phases p, and a is a pitch length of the first poles in the pole groups.

6. The electric apparatus of claims 1 or 2, wherein the windings for the first poles in each pole group all contain the same number of turns.

7. The electric apparatus of claims 1 or 2, the apparatus being a brushless DC motor.

8. The electric apparatus of claims 1 or 2, the apparatus being a rotary device wherein oppositely located poles at the same diameter are connected to the same electrical phase.

9. An electric apparatus, comprising:
a field magnet having different magnetic poles included in the field magnet, the different magnetic poles formed alternately at an equal spacing;
an armature having an armature core and armature windings, the armature core including protruding first and second poles, each of the first and second poles having ends, the different magnetic poles included in the field magnet arranged to oppose the ends of the first and second poles;
electrical windings wound on each one of the first poles, the electrical windings electrically connected to one phase of a multiphase electrical power source, the field magnet and the armature being arranged to move in complete successive rotations in relation to each other such that a gap is maintained between the poles of the field magnet and the poles of the armature, the first poles arranged in pole groups such that the windings of the poles in a pole group are connected to a same electrical phase, each pole group including at least two first poles, each pole in a pole group located immediately adjacent to another pole of the same pole group, and when more than one pole group is connected to an electrical phase, located therebetween is at least one other pole group the poles of which are connected to a different electrical phase, the pitch of the poles in a pole group being equal to the pitch of the magnetic poles of the field magnet;

the second poles operative as flux balancing poles, the flux balancing poles not belonging to any pole group, the flux balancing poles arranged such that a magnetic flux in a first pole of a pole group adjacent to a flux balancing pole is essentially equally to a flux in other first poles in the same pole group, the flux balancing poles having one of no windings and windings having a lower number of turns than a number of turns of the windings belonging to first poles in pole groups.

10. The electric apparatus of claim 9, wherein portions of the armature poles which face the field magnet extend only in the direction of and opposite to a direction of movement direction, such that gaps between said portions belonging to adjacent armature poles are gaps being small in relation to the width of said portions in the movement direction.

11. The electric apparatus of claims 9 or 10, wherein all pole groups contain the same number of first poles.

12. The electric apparatus of claims 9 or 10, wherein a pitch length of slots on opposite sides of at least one flux balancing pole is different than a pitch length of the first poles in the pole groups.

13. The electric apparatus of claims 9 or 10, wherein a pitch length of the flux balancing poles is substantially equal to the product of a and (n/p), where n is a small natural number having no common factors with a number of phases p, and a is a pitch length of the first poles in the pole groups.

14. The electric apparatus of claims 9 or 10, wherein the windings for the first poles in each pole group all contain the same number of turns.

15. The electric apparatus of claims 9 or 10, the apparatus being a brushless DC motor.

16. The electric apparatus of claims 9 or 10, the apparatus being a rotary device wherein oppositely located poles at the same diameter are connected to the same electrical phase.

* * * * *